(12) United States Patent
Julian et al.

(10) Patent No.: US 11,322,018 B2
(45) Date of Patent: May 3, 2022

(54) DETERMINING CAUSATION OF TRAFFIC EVENTS AND ENCOURAGING GOOD DRIVING BEHAVIOR

(71) Applicant: NETRADYNE, INC., San Diego, CA (US)

(72) Inventors: David Jonathan Julian, San Diego, CA (US); Venkata Sreekanta Reddy Annapureddy, La Jolla, CA (US); Michael Campos, San Diego, CA (US); Avneesh Agrawal, Bengaluru (IN); Adam David Kahn, San Diego, CA (US); Sandeep Pandya, San Diego, CA (US)

(73) Assignee: NETRADYNE, INC., San Diego, CA (US)

( * ) Notice: Subject to any disclaimer, the term of this patent is extended or adjusted under 35 U.S.C. 154(b) by 602 days.

(21) Appl. No.: 16/321,720

(22) PCT Filed: Jul. 31, 2017

(86) PCT No.: PCT/US2017/044755
§ 371 (c)(1),
(2) Date: Jan. 29, 2019

(87) PCT Pub. No.: WO2018/026733
PCT Pub. Date: Feb. 8, 2018

(65) Prior Publication Data
US 2020/0058218 A1    Feb. 20, 2020

Related U.S. Application Data

(60) Provisional application No. 62/371,200, filed on Aug. 4, 2016, provisional application No. 62/369,183, filed on Jul. 31, 2016.

(51) Int. Cl.
*G06G 7/70* (2006.01)
*G08G 1/01* (2006.01)
(Continued)

(52) U.S. Cl.
CPC .......... *G08G 1/0125* (2013.01); *G06V 20/38* (2022.01); *G06V 20/56* (2022.01); *G08G 1/04* (2013.01);
(Continued)

(58) Field of Classification Search
CPC .... G08G 1/0125; G08G 1/04; G06K 9/00697; G06K 9/00791; G06K 2209/23; G06Q 40/08
See application file for complete search history.

(56) References Cited

U.S. PATENT DOCUMENTS 5,808,728 A    9/1998  Uehara
6,188,329 B1   2/2001  Glier et al.
(Continued)

FOREIGN PATENT DOCUMENTS

KR   10-2014-0080105 A    6/2014
WO   WO-2017/123665 A1    7/2017
WO   WO-2017/165627 A1    9/2017

OTHER PUBLICATIONS

European Patent Office, Extended Search Report dated Jul. 1, 2019, re Application No. 17837484.9-1207 / PCT/US2017044755, 10 pgs.
(Continued)

*Primary Examiner* — Adam M Alharbi
(74) *Attorney, Agent, or Firm* — Foley & Lardner LLP

(57) ABSTRACT

Systems and methods are provided for determining cause of atypical traffic events and/or encouraging good driving behavior. The systems and methods may involve a camera sensor and/or inertial sensors to detect traffic events, as well analytical methods that may attribute a cause to the traffic
(Continued)

event. The systems and methods include a processor that is configured to determine an occurrence of an atypical traffic event at or near a monitored vehicle; and determine a cause of the atypical traffic event based on data collected at the monitored vehicle, wherein the cause of the atypical traffic event is at least one of: a driver or control system of the monitored vehicle; a second driver or second control system of a second vehicle; and a road condition.

25 Claims, 21 Drawing Sheets

(51) Int. Cl.
*G08G 1/04* (2006.01)
*G06V 20/00* (2022.01)
*G06V 20/56* (2022.01)
*G06Q 40/08* (2012.01)

(52) U.S. Cl.
CPC ......... *G06Q 40/08* (2013.01); *G06V 2201/08* (2022.01)

(56) References Cited

U.S. PATENT DOCUMENTS

| | | |
|---|---|---|
| 6,281,808 B1 | 8/2001 | Glier et al. |
| 6,768,944 B2 | 7/2004 | Breed et al. |
| 6,985,827 B2 | 1/2006 | Williams et al. |
| 7,254,482 B2 | 8/2007 | Kawasaki et al. |
| 7,825,825 B2 | 11/2010 | Park |
| 7,957,559 B2 | 6/2011 | Shima et al. |
| 8,031,062 B2 | 10/2011 | Smith |
| 8,144,030 B1 | 3/2012 | Lipke |
| 8,258,982 B2 | 9/2012 | Miura |
| 8,446,781 B1 | 5/2013 | Rajan et al. |
| 8,531,520 B2 | 9/2013 | Stricklin et al. |
| 8,560,164 B2 | 10/2013 | Nielsen |
| 8,645,535 B1 | 2/2014 | Martini |
| 8,676,492 B2 | 3/2014 | Litkouhi et al. |
| 8,773,281 B2 | 7/2014 | Ghazarian |
| 8,855,904 B1 | 10/2014 | Templeton et al. |
| 8,912,016 B2 | 12/2014 | Godo et al. |
| 8,972,076 B2 | 3/2015 | Ogawa |
| 9,047,773 B2 | 6/2015 | Chen et al. |
| 9,081,650 B1 | 7/2015 | Brinkmann et al. |
| 9,104,535 B1 | 8/2015 | Brinkmann et al. |
| 9,147,353 B1 | 9/2015 | Slusar |
| 9,158,980 B1 | 10/2015 | Ferguson et al. |
| 9,524,269 B1 | 12/2016 | Brinkmann et al. |
| 9,535,878 B1 | 1/2017 | Brinkmann et al. |
| 9,558,656 B1 | 1/2017 | Brinkmann et al. |
| 9,672,734 B1 | 6/2017 | Ratnasingam |
| 9,676,392 B1 | 6/2017 | Brinkmann et al. |
| 9,677,530 B2 | 6/2017 | Gibson et al. |
| 10,029,696 B1 | 7/2018 | Ferguson |
| 10,053,010 B2 | 8/2018 | Thompson et al. |
| 10,151,840 B2 | 12/2018 | Itoh et al. |
| 10,157,423 B1 | 12/2018 | Fields et al. |
| 10,176,524 B1 | 1/2019 | Brandmaier |
| 10,229,461 B2 | 3/2019 | Akiva |
| 10,347,127 B2 | 7/2019 | Droz et al. |
| 10,407,078 B2 | 9/2019 | Ratnasingam |
| 10,449,967 B1 | 10/2019 | Ferguson |
| 10,475,338 B1* | 11/2019 | Noel .................. G08G 1/04 |
| 10,782,654 B2 | 9/2020 | Campos et al. |
| 10,796,369 B1* | 10/2020 | Augustine .............. G06Q 40/08 |
| 10,803,525 B1* | 10/2020 | Augustine .............. G06Q 40/08 |
| 11,004,000 B1 | 5/2021 | Gutmann et al. |
| 2002/0054210 A1 | 5/2002 | Glier et al. |
| 2004/0054513 A1 | 3/2004 | Laird et al. |
| 2004/0101166 A1 | 5/2004 | Williams et al. |
| 2007/0027583 A1 | 2/2007 | Tamir et al. |
| 2007/0193811 A1 | 8/2007 | Breed |
| 2008/0130302 A1 | 6/2008 | Watanabe |
| 2008/0162027 A1 | 7/2008 | Murphy et al. |
| 2009/0115632 A1 | 5/2009 | Park |
| 2009/0265069 A1 | 10/2009 | Desbrunes |
| 2009/0284361 A1 | 11/2009 | Boddie |
| 2010/0023296 A1 | 1/2010 | Huang et al. |
| 2010/0033571 A1 | 2/2010 | Fujita et al. |
| 2010/0045799 A1 | 2/2010 | Lei |
| 2010/0052883 A1 | 3/2010 | Person |
| 2010/0073194 A1 | 3/2010 | Ghazarian |
| 2010/0145600 A1 | 6/2010 | Son et al. |
| 2010/0157061 A1 | 6/2010 | Katsman et al. |
| 2010/0198491 A1 | 8/2010 | Mays |
| 2010/0238262 A1 | 9/2010 | Kurtz |
| 2011/0071746 A1 | 3/2011 | O'Connor Gibson et al. |
| 2011/0077028 A1 | 3/2011 | Wilkes |
| 2011/0182475 A1 | 7/2011 | Fairfield et al. |
| 2012/0033896 A1 | 2/2012 | Barrows |
| 2012/0056756 A1 | 3/2012 | Yester |
| 2012/0095646 A1 | 4/2012 | Ghazarian |
| 2012/0179358 A1 | 7/2012 | Chang et al. |
| 2012/0194357 A1 | 8/2012 | Ciolli |
| 2012/0288138 A1 | 11/2012 | Zeng |
| 2013/0154854 A1 | 6/2013 | Chen et al. |
| 2013/0338914 A1 | 12/2013 | Weiss |
| 2013/0344859 A1 | 12/2013 | Abramson et al. |
| 2014/0016826 A1 | 1/2014 | Fairfield et al. |
| 2014/0032089 A1 | 1/2014 | Aoude et al. |
| 2014/0122392 A1 | 5/2014 | Nicholson et al. |
| 2014/0236414 A1 | 8/2014 | Droz |
| 2015/0025784 A1 | 1/2015 | Kastner |
| 2015/0039175 A1 | 2/2015 | Martin et al. |
| 2015/0039350 A1 | 2/2015 | Martin et al. |
| 2015/0105989 A1 | 4/2015 | Lueke et al. |
| 2015/0112504 A1 | 4/2015 | Binion |
| 2015/0170002 A1 | 6/2015 | Szegedy |
| 2015/0175168 A1 | 6/2015 | Hoye et al. |
| 2015/0178578 A1 | 6/2015 | Hampiholi |
| 2015/0178998 A1 | 6/2015 | Attard |
| 2015/0194035 A1 | 7/2015 | Akiva et al. |
| 2015/0210274 A1 | 7/2015 | Clarke et al. |
| 2015/0193885 A1 | 9/2015 | Akiva et al. |
| 2015/0248836 A1 | 9/2015 | Alselimi |
| 2015/0281305 A1 | 10/2015 | Sievert et al. |
| 2015/0293534 A1 | 10/2015 | Takamatsu |
| 2015/0329045 A1 | 11/2015 | Harris |
| 2015/0332590 A1 | 11/2015 | Magna |
| 2015/0336547 A1 | 11/2015 | Dagan |
| 2015/0379869 A1 | 12/2015 | Ferguson et al. |
| 2016/0027292 A1 | 1/2016 | Kerning |
| 2016/0035223 A1 | 2/2016 | Gutmann et al. |
| 2016/0140438 A1 | 5/2016 | Yang et al. |
| 2016/0150070 A1 | 5/2016 | Goren |
| 2016/0176358 A1 | 6/2016 | Raghu et al. |
| 2016/0180707 A1 | 6/2016 | MacNeille et al. |
| 2016/0187487 A1 | 6/2016 | Itoh et al. |
| 2016/0203719 A1 | 7/2016 | Divekar et al. |
| 2016/0343254 A1 | 11/2016 | Rovik |
| 2016/0358477 A1 | 12/2016 | Ansari |
| 2017/0015318 A1 | 1/2017 | Scofield et al. |
| 2017/0021863 A1 | 1/2017 | Thompson et al. |
| 2017/0036673 A1 | 2/2017 | Lee |
| 2017/0080853 A1 | 3/2017 | Raghu et al. |
| 2017/0086050 A1 | 3/2017 | Kerning et al. |
| 2017/0097243 A1 | 4/2017 | Ricci |
| 2017/0113665 A1 | 4/2017 | Mudalige et al. |
| 2017/0200061 A1 | 7/2017 | Julian et al. |
| 2017/0200063 A1 | 7/2017 | Nariyambut Murali et al. |
| 2017/0206434 A1 | 7/2017 | Nariyambut Murali et al. |
| 2017/0217430 A1 | 8/2017 | Sherony |
| 2017/0243073 A1 | 8/2017 | Raghu et al. |
| 2017/0261991 A1 | 9/2017 | Raghu |
| 2017/0279957 A1 | 9/2017 | Abramson |
| 2017/0305434 A1 | 10/2017 | Ratnasingam |
| 2018/0003965 A1 | 1/2018 | O'Toole et al. |
| 2018/0017799 A1 | 1/2018 | Ahmad et al. |
| 2018/0018869 A1 | 1/2018 | Ahmad et al. |
| 2018/0120859 A1 | 5/2018 | Eagleberg |
| 2018/0253963 A1 | 9/2018 | Coelho De Azevedo |

(56) References Cited

U.S. PATENT DOCUMENTS

| | | |
|---|---|---|
| 2018/0300567 A1 | 10/2018 | Qin et al. |
| 2018/0321686 A1 | 11/2018 | Kanzawa et al. |
| 2019/0005812 A1 | 1/2019 | Matus et al. |
| 2019/0031088 A1 | 1/2019 | Hiramatsu et al. |
| 2019/0369637 A1 | 12/2019 | Shalev-Shwartz et al. |
| 2019/0377354 A1 | 12/2019 | Shalev-Shwartz |

OTHER PUBLICATIONS

Hunter et al., "The path inference filter: model-based low-latency map matching of probe vehicle data", Algorithmic Foundations of Robotics X, Jun. 20, 2012, arXiv:1109.1966v2, retrieved from URL: https://arxiv.org/pdf/1109.1996.pdf (23 pages).
International Preliminary Report on Patentability, Ch. I, for PCT/US2017/013062 dated Mar. 30, 2017 (8 pages).
International Preliminary Report on Patentability, Ch. II, for PCT/US2017/044755 dated Sep. 30, 2018 (33 pages).
International Search Report and Written Opinion for PCT/US2017/13062 dated Mar. 30, 2017 (9 pages).
International Search Report for PCT/US2018/053636 dated Dec. 7, 2018 (3 pages).
International Search Report for PCT/US2018/055631 dated Jan. 4, 2019 (2 pages).
Office Action for IN 20187030012 May 31, 2021 (8 pages).
Written Opinion of the International Searching Authority for PCT/US2018/053636 dated Dec. 7, 2018 (9 pages).
Written Opinion of the International Searching Authority for PCT/US2018/055631 dated Jan. 4, 2019 (4 pages).
ISA/US, International Search Report and Written Opinion issued on PCT/2017/044755, dated Oct. 17, 2017, 9 pgs.
Extended European Search Report, issued in European Application No. EP17837484.9, and dated Jul. 1, 2019.
Extended European Search Report for EP 18863528.8 dated Oct. 30, 2020 (9 pages).
Hou et al., "Tube Convolutional Neural Network (T-CNN) for Action Detection in Videos", Computer Vision Foundation, DOI: 10.1109/ICCV.2017.620, retrieved Jan. 17, 2019 from URL: https://arxiv.org/pdf/1703.10664.pdf (10 pages).

* cited by examiner

| Driver Score Details | | | | | | | |
|---|---|---|---|---|---|---|---|
| | | July 27, 2017 | | July 24 - 30, 2017 | | July 2017 | |
| | Driver Name | Running Score | Graph | Running Score | Graph | Running Score | Graph |
| ⊗ | Fleet Average | 917 | ⌣ | 903 | ⌒ | 904 | ⌒ |
| ⊗ | fnTruck#16300088 lnDriver16300088 | 884 ▷ -33 (-3%) | ⌒ | 891 ▷ -12 (-1%) | / | 891 ▷ -13 (-1%) | / |
| ⊗ | fnTruck#16300063 lnDriver16300063 | 898 ▷ -19 (-2%) | ⌒ | 894 ▷ -9 (0%) | / | 894 ▷ -10 (-1%) | / |
| ⊗ | fnTruck#16300132 lnDriver16300132 | 892 ▷ -25 (-2%) | ⌒ | 890 ▷ -13 (-1%) | / | 890 ▷ -14 (-1%) | / |
| ⊗ | fnTruck#16300112 lnDriver16300112 | 892 ▷ -25 (-2%) | ⌒ | 904 ◁ 1 (0%) | \ | 904 ◁ 0 (0%) | \ |
| ⊗ | fnTruck#16300094 lnDriver16300094 | 936 ◁ 19 (2%) | ⌒ | 885 ▷ -18 (-1%) | \ | 885 ▷ -19 (-2%) | \ |
| ⊗ | fnTruck#16300094 lnDriver16300094 | 788 ▷ -129 (-14%) | ⌒ | 910 ◁ 7 (0%) | --- | 910 ◁ 6 (0%) | --- |

FIG. 12

DETERMINING CAUSATION OF TRAFFIC EVENTS AND ENCOURAGING GOOD DRIVING BEHAVIOR

CROSS REFERENCE TO RELATED APPLICATIONS

The present application claims the benefit of and is a National Stage Application under 35 C.F.R. § 371 of International Application No. PCT/US2017/044755, filed on Jul. 31, 2017, and titled, "DETERMINING CAUSATION OF TRAFFIC EVENTS AND ENCOURAGING GOOD DRIVING BEHAVIOR," which claims the benefit of U.S. Provisional Patent Application No. 62/369,183, filed on Jul. 31, 2016, and titled, "ENCOURAGING GOOD DRIVING BEHAVIOR", and U.S. Provisional Patent Application No. 62/371,200, filed on Aug. 4, 2016, and titled, "DETERMINING CAUSATION OF TRAFFIC EVENTS." The entire disclosures of each of the aforementioned applications are hereby expressly incorporated by reference herein in their entireties.

BACKGROUND

Field

Certain aspects of the present disclosure generally relate to intelligent driving monitoring systems (IDMS), driver monitoring systems, advanced driver assistance systems (ADAS), and autonomous driving systems, and more particularly to systems and methods for determining causation of traffic events and systems and methods for monitoring the behavior of drivers and encouraging good driving behavior.

Background

Vehicles, such as automobiles, trucks, tractors, motorcycles, bicycles, airplanes, drones, ships, boats, submarines, and others, are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

Drivers may sometimes drive unsafely or inefficiently. Unsafe driving behavior may endanger the driver and other drivers and may risk damaging the vehicle. Unsafe driving behaviors may also lead to fines. For example, highway patrol officers may issue a citation for speeding. Unsafe driving behavior may also lead to accidents, which may cause physical harm, and which may, in turn, lead to an increase in insurance rates for operating a vehicle. Inefficient driving, which may include hard accelerations, may increase the costs associated with operating a vehicle.

Driving behavior may be monitored. Driver monitoring may be done in real-time as the driver operates a vehicle, or may be done at a later time based on recorded data. Driver monitoring at a later time may be useful, for example, when investigating the cause of an accident. Driver monitoring in real-time may be useful to guard against unsafe driving, for example, by ensuring that a car cannot exceed a certain pre-determined speed. The types of monitoring available today, however, may be based on sensors that do not provide context to a traffic event. For example, an accelerometer may be used to detect a sudden deceleration associated with a hard-stopping event, but the accelerometer may not be aware of the cause of the hard-stopping event.

Prior approaches to driver monitoring may be based on the occurrence of negative driving events, such as hard-braking or speeding, and may not consider positive measures, such as determinations of good driving behavior.

SUMMARY

Certain aspects of the present disclosure generally relate to providing, implementing, and using a method of determining causation of traffic events and/or a method of encouraging good driving behavior. The methods may involve a camera sensor and/or inertial sensors to detect traffic events, as well analytical methods that may attribute a cause to the traffic event.

Certain aspects of the present disclosure provide a system. The system generally includes a memory and a processor coupled to the memory. The processor is configured to: determine an occurrence of an atypical traffic event at or near a monitored vehicle; and determine a cause of the atypical traffic event based on data collected at the monitored vehicle, wherein the cause of the atypical traffic event is at least one of: a driver or control system of the monitored vehicle; a second driver or second control system of a second vehicle; and a road condition.

Certain aspects of the present disclosure provide a non-transitory computer readable medium having instructions stored thereon. Upon execution, the instructions cause the computing device to perform operations comprising: determining an occurrence of an atypical traffic event at or near a monitored vehicle; and determining a cause of the of the atypical traffic event based on data collected at the monitored vehicle, wherein the cause of the atypical traffic event is at least one of: a driver or control system of the monitored vehicle; a second driver or second control system of a second vehicle; and a road condition.

Certain aspects of the present disclosure provide a method. The method generally includes determining, by a processor of a computing device, an occurrence of an atypical traffic event at or near a monitored vehicle; and determining, by the processor, a cause of the of the atypical traffic event based on data collected at the monitored vehicle, wherein the cause of the atypical traffic event is at least one of: a driver or control system of the monitored vehicle; a second driver or second control system of a second vehicle; and a road condition.

BRIEF DESCRIPTION OF DRAWINGS

FIG. 12 illustrates an example of a system for determining cause of traffic events and/or encouraging good driving behavior in accordance with certain aspects of the present disclosure.

DETAILED DESCRIPTION

Figure 1:
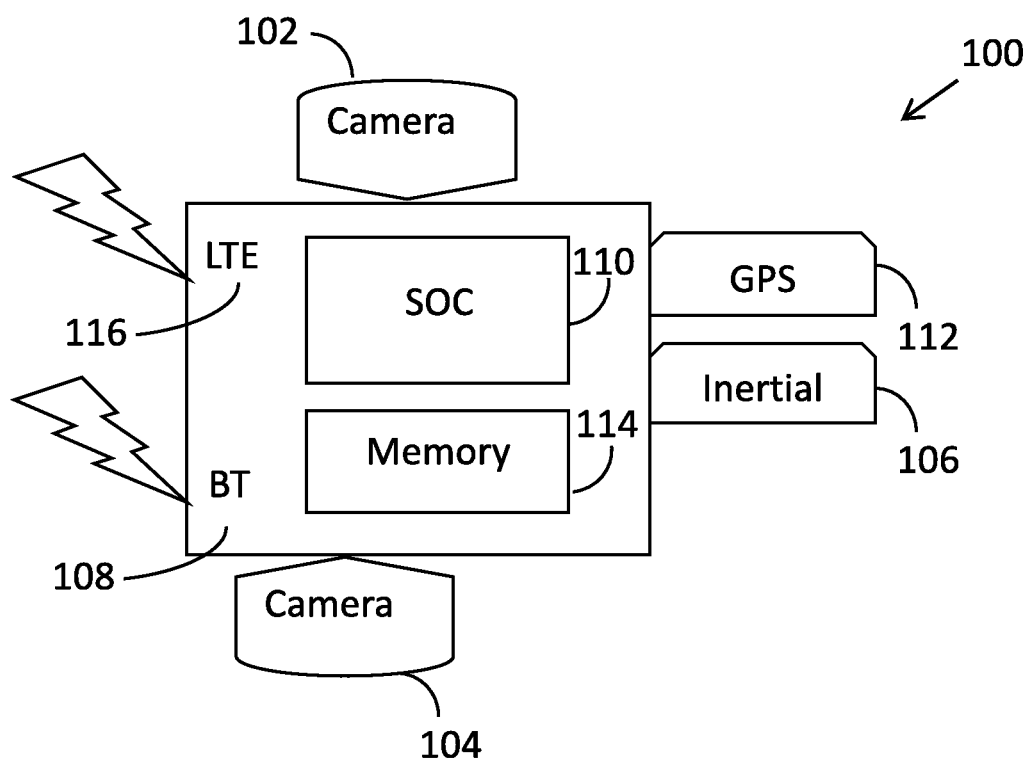
FIG. 1 illustrates an example of a system for determining cause of traffic events and/or encouraging good driving behavior in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Monitoring and Characterization of Driver Behavior

Aspects of the present disclosure are directed to methods of monitoring and characterizing driver behavior, which may include methods of determining cause of traffic events. An accurate characterization of driver behavior has multiple applications. Insurance companies may use accurately characterized driver behavior to influence premiums. Insurance companies might, for example, reward 'good' behavior and dis-incentivize 'bad' behavior. Fleet owners might use accurately characterized driver behavior to incentivize their drivers. Likewise, taxi aggregators might incentivize taxi driver behavior. Taxi or ride-sharing aggregator customers might also use past characterizations of driver behavior to filter and select drivers based on driver behavior criteria. For example, to ensure safety, drivers of children or other vulnerable populations might be screened based on driving behavior exhibited in the past. Parents may wish to monitor the driving patterns of their kids and may further utilize methods of monitoring and characterizing driver behavior to incentivize safe driving behavior.

In addition to human drivers, machine controllers are increasingly being used to drive vehicles. Self-driving cars, for example, include a machine controller that interprets sensory inputs and issues control signals to the car so that the car may be driven without a human driver. As with human drivers, machine controllers may also exhibit unsafe or inefficient driving behaviors. Information relating to the driving behavior of a self-driving car would be of interest to engineers attempting to perfect the self-driving car's controller, to law-makers considering policies relating to self-driving cars, and to other interested parties.

Visual information may improve existing ways or enable new ways of monitoring and characterizing driver behavior. For example, according to aspects of the present disclosure, the visual environment around a driver may inform a characterization of driver behavior. Typically, running a red light may be considered a 'bad' driving behavior. In some contexts, however, such as when a traffic guard is standing at an intersection and using hand gestures to instruct a driver to move through a red light, driving through a red light would be considered 'good' driving behavior. In some contexts, a 'bad' driving behavior, such as tailgating, may not be the fault of the driver. For example, another driver may have pulled into the driver's lane at an unsafe distance ahead of the driver. Visual information may also improve the quality of a characterization that may be based on other forms of sensor data, such as determining a safe driving speed, as described below. The costs of accurately characterizing driver behavior using computer vision methods in accordance with certain aspects of the present disclosure may be less than the costs of alternative methods that use human inspection of visual data. Camera based methods may have lower hardware costs compared with methods that involve RADAR or LiDAR. Still, methods that use RADAR or LiDAR are also contemplated for determination of cause of traffic events, either alone or in combination with a vision sensor, in accordance with certain aspects of the present disclosure.

FIG. 1 illustrates an embodiment of the aforementioned system for determining cause of traffic events and/or encouraging a driving behavior. The device 100 may include input sensors (which may include a forward-facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system for determining cause of traffic event may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112, or integrated within a System-on-a-chip 110. The device may further include memory storage 114.

A system for determining cause of traffic events and/or encouraging good driving behavior, in accordance with certain aspects of the present disclosure, may assess the driver's behavior in real-time. For example, an in-car monitoring system, such as the device 100 illustrated in FIG. 1 that may be mounted to a car, may perform analysis in support of a driver behavior assessment in real-time, and may determine cause of traffic events as they occur. In this example, the system, in comparison with a system that does not include real-time processing, may avoid storing large amounts of sensor data since it may instead store a processed and reduced set of the data. Similarly, or in addition, the system may incur fewer costs associated with wirelessly transmitting data to a remote server. Such a system may also encounter fewer wireless coverage issues.

Figure 2:
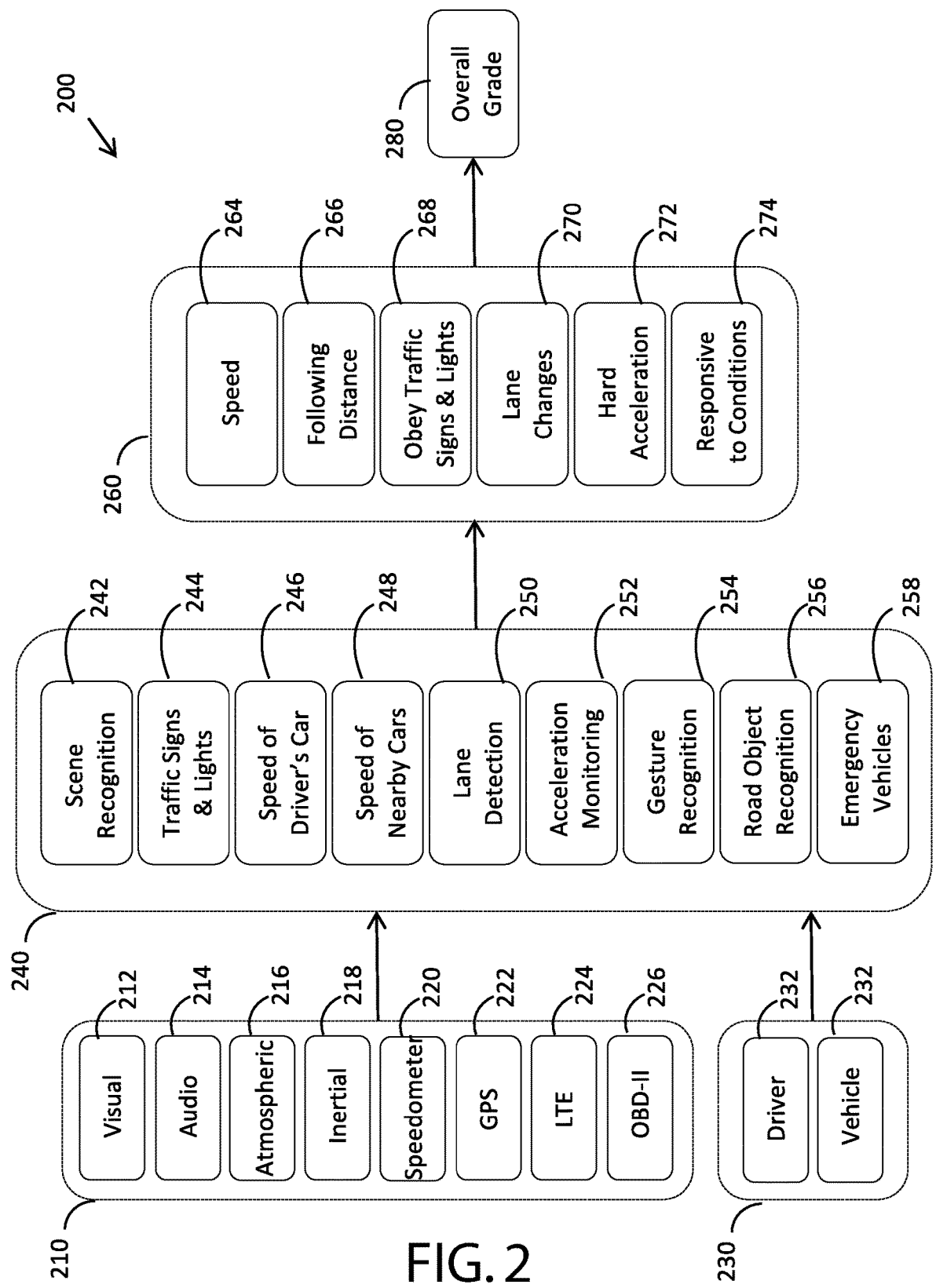
FIG. 2 illustrates an example of a driver monitoring system in accordance with certain aspects of the present disclosure.

A system for determining cause of traffic events and/or encouraging a driving behavior, in accordance with certain aspects of the present disclosure, may assess the driver's behavior in several contexts and perhaps using several metrics. FIG. 2 illustrates a system of driver monitoring, which may include a system for determining cause of traffic events, in accordance with aspects of the present disclosure.

The system may include sensors 210, profiles 230, sensory recognition and monitoring modules 240, assessment modules 260, and may produce an overall grade 280. Contemplated driver assessment modules include speed assessment 262, safe following distance 264, obeying traffic signs and lights 266, safe lane changes and lane position 268, hard accelerations including turns 270, responding to traffic officers, responding to road conditions 272, and responding to emergency vehicles. Each of these exemplary features is described in PCT application PCT/US17/13062, entitled "DRIVER BEHAVIOR MONITORING", filed 11 Jan. 2017, which is incorporated herein by reference in its entirety. The present disclosure is not so limiting, however. Many other features of driving behavior may be monitored, assessed, and characterized in accordance with the present disclosure.

Safe Following Distance

Aspects of the present disclosure are directed to visually measuring a following distance 264, which is a distance to a vehicle directly in front of a driver's car. Several methods of visually measuring the following distance are contemplated. For example, a mono-camera 102 may be used to identify the type of vehicle being followed, such as a sedan, van, or semi-truck. In this example, the following distance may be based on feature sizes, such as width, or the relative feature sizes of multiple features associated with each type of vehicle. In another example, a machine learning model, such as a deep neural network, may be used to determine the distance based on the input pixels corresponding to the vehicle ahead. While the preceding examples utilize a mono-camera, the present disclosure is not so limiting. In another example, multiple cameras and/or other sensors, such as RADAR, Ultrasound (SONAR), or LiDAR, may be used to determine the distance to the vehicle ahead. In addition, multiple methods may be combined to estimate the distance.

In an embodiment of the present disclosure, a driver monitoring system may determine the speed of the driver's vehicle 246 and the speed of the vehicle ahead 248. The system may then assess the driver's safe following behavior 264, and determine a safe following grade as a function of the distance to the car and the speeds of the vehicles. In addition, the system may further determine the speed of other traffic 248 and may incorporate the speed of other traffic in the assessment of the driver's safe following behavior 268.

In another embodiment of the aforementioned driver monitoring system, the determined following distance may be converted from a unit of distance, such as from feet or meters, to a unit of time, such as seconds. In this example, the assessment of safe following behavior 264 may be based on this inferred measure of following time. The driver grade for safe following behavior may be computed as a function of the following distance in time, and may also be based on the estimated stopping time based on the current speed of the car 246. For example, driving with less than 0.7 seconds following time while travelling 30 MPH, or driving with less than 1 second following time while travelling 65 MPH may result in a reduction in the driver's safe following grade. Other threshold values may be used depending on the safety and/or fuel efficiency goals of a driver. Threshold values may be set, for example, by a safety manager of a vehicle fleet. For example, a system may be configured such that driving with less than 2 seconds following time while travelling 30 MPH, or driving with less than 5 seconds following time while travelling 65 MPH may result in a reduction in the driver's safe following grade. Safe following thresholds may also be based, at least in part, on weather conditions, posted speed limits, or customary speeds and/or following distances for a given road or for a given region.

In the present example, a method of determining the following distance in accordance with the present disclosure may involve a computer vision model. For example, the determination of following distance may involve recognizing the type of vehicle ahead along with the make and model of the vehicle, determining dimensions of the vehicle based on the make and model, computing the observed dimensions of the vehicle, and estimating the distance based on the relationship between the observed and known vehicle dimensions. Similarly, a computer vision model may be based on the detection of the vehicle without recognizing the make and model of the vehicle, and estimating the distance based on a relationship between the observed and known average or median vehicle dimensions of that type. Alternatively, a neural network, such as a deep neural network, may be trained on a set of distance estimates associated with stored sensor inputs. A neural network trained on such inputs may then output an estimate of following distance to a detected car based on a new set of inputs.

Safe Lane Changes and Lane Position

Aspects of the present disclosure may be directed to assessing the quality of lane changes and lane position 268. For example, the driver monitor system may use either visual 212, RADAR, LiDAR, or other systems 210 to determine the relative positions of vehicles around the car. The driver monitoring system may then assess the driver's aptitude in maintaining a safe location, such as not driving next to cars in adjacent lanes, but rather maintaining an offset in position. During lane changes, the driver monitoring system may assess a characteristic of the driver's driving behavior (such as ability, safety, and the like) based on the relative distances and speeds of the driver's car 246 and nearby cars 248 when changing lanes. In addition, this assessment may be based on whether and when the driver signaled lane changes, which may be accessed via the OBD-II 226, and/or with the aid of a microphone that can detect and recognize the sound of a turn signal indicator.

The driver monitoring system may also determine the rate of closure of cars in adjacent lanes and use that rate of closure to modify the driver assessment. For example, if a driver changes into a lane with a fast approaching car, the distance threshold for a safe assessment of the lane change may be greater than it would have been if the approaching car were going about the same speed as the driver's car.

The driver monitoring system may be configured to estimate the fault of an unsafe driving behavior or context. For example, a driver's safe following distance behavior may be scored negatively if the driver is closer than a safe following distance to the vehicle ahead. Such an event may be referred to as a tailgating event, and described below. However, the system may determine that another driver swerved in front of the driver and thus caused the unsafe following distance. In this case, the safe following assessment may be adjusted for the driver since the unsafe driving behavior may have been a fault of the other driver.

In one embodiment, the driver monitoring system may track the lane markings 250 or estimate the line separations, determine the car's position with respect to the lane markings, and assess the extent to which the driver maintains a safe lane position. For example, the driver may be graded up for maintaining a center location, and may be graded down for getting too close to the lane edges or crossing over lane edges. In addition, an accelerometer 218 may be used to detect freeway rumble ridges, infer crossing into the shoulder, and the driver's behavior may be graded down. Still, the visual system 212 may be used to adjust the grading if it recognizes a construction zone with a scene recognition module 242 or recognizes construction cones with a road object module 256 directing vehicles into the shoulder, for example. Other methods, such as crowd sourcing in the cloud across drivers, which may be accessed via LTE 224, may also be used to determine exceptions. For example, if many drivers are making the same violation at about the same location, it may be determined that an exception condition is likely.

Advanced Path Prediction

Certain aspects of the present disclosure may include Advanced Path Prediction (APP). Systems and methods of advanced path prediction are described in PCT application PCT/US17/23781—"Advanced Path Prediction", filed 23 Mar. 2017, which is incorporated herein by reference in its entirety. According to certain aspects, the path of travel may be mapped to a camera view, and/or may incorporate information from later points in time.

APP may be applied to systems that determine driving behaviors in response to objects in the environment. Tailgating, for example, is a driving behavior in which a Driver drives at an unsafe distance behind the car ahead of it in the same lane. Since a determination of tailgating behavior depends on a determination of the lane occupied by each of two cars, a method for determining a lane of travel may be desirable for a system for determining cause of traffic events. A driving monitoring system with robust lane detection, for example, may be able to properly ignore situations that may appear to be tailgating but in which the car ahead is actually in a different lane.

Given the determined object locations and determined future path of travel, either estimated or measured and projected, it may be desirable to determine interactions between the determined path and the detected objects. Approaches that estimate a path of travel or measure the future path of travel may assume a path width based on either a typical lane width, such as 3.7 m, or based on the measured or estimated typical width of the ego-car. Additionally, the future path may use lane estimation so that when lane markings are present the width and shift of the lane markings may be adaptively matched up to the computed or estimated future path of travel. In this example, when the vehicle travels in areas where the lane tracking algorithm temporary loses track, such as in areas with lighting variations from overpasses, or areas facing toward the sun at sunrise/sunset, or fresh pavement where lane markings have not yet been added, the path of travel alone may determine the lanes. Still, the determined location and width of the lanes may be more accurate due to the recent prior interaction with the lane detection algorithm. In some embodiments, a system may measure the offset from the center lane and the width of a lane. In some embodiments, the lane detection system may include a tracking algorithm such as a Kalman Filter.

Atypical Traffic Events

Disclosed herein are methods and systems for determining the causes of traffic events. In particular, this disclosure focuses on determining the causes of atypical traffic events. Although any act or event while driving a vehicle may be characterized as an event, atypical traffic events as described herein are notable because they may lead to some unsafe condition that has a higher probability of leading to an accident. For example, described herein are atypical events that do not occur all the time, but in some contexts may lead to unsafe conditions.

The systems and methods disclosed herein may determine whether a driver or control system of a vehicle is the cause of an atypical traffic event, and may further determine whether such an atypical traffic event is actually unsafe. For example, atypical traffic events as disclosed herein may refer to when one vehicle tailgates another or when a red light is run by a vehicle. In certain scenarios, a driver or control system of a vehicle may not be the cause of such atypical events, as disclosed herein. Other atypical traffic events may be related to an inertial event, such as hard braking or accelerating. Other atypical traffic events may be manually input. For example, a traffic guard may report an atypical traffic event that a particular vehicle disregarded an instruction of the traffic guard when passing through an intersection. Accordingly, as used herein, an atypical traffic event can be any event that may be unsafe that may have been caused by a driver or control system of a monitored vehicle. When the systems and methods disclosed herein determine that a driver or control system of a vehicle was not the cause of an atypical traffic event, the driver or control system can be said to have performed permitted actions with respect to the traffic event, may be said to have responded appropriately to the traffic event, and the like.

As used herein, a monitored vehicle is a vehicle for which the systems and methods disclosed herein determine causation for atypical traffic events experienced by or at the vehicle. The vehicle may be monitored by systems, sensors, processors, cameras, etc. installed on or in the vehicle. The vehicle may also be monitored by external cameras, sensors, etc. The data collected to monitor a vehicle can be processed by a device in or on the vehicle, or by a remote device, as described herein. A monitored vehicle is any vehicle for which the systems and methods described herein determine causation with respect to atypical traffic events.

In various embodiments, more than one vehicle at a time may be a monitored vehicle. For example, if a monitoring system is installed on a first vehicle, the system may determine that the first vehicle is not the cause of an atypical traffic event. However, it is contemplated herein that the system may also determine that a second vehicle caused an atypical traffic event. In various embodiments, a system may report only that the first vehicle was not the cause of the atypical traffic event, and/or may also report details relating to the second vehicle that caused the atypical traffic event to a remote server or to another device nearby, such as a Wi-Fi enabled hard-drive affixed to a traffic pole.

For example, it may be desirable to collect data on other vehicles on the road, particularly when those vehicles are the cause of atypical traffic events. Such information may be valuable in a number of ways. For example, the system could use the information to avoid certain drivers or vehicle types in the future. In another example, the system may identify a vehicle type or fleet and report that information back to a manager of a fleet or other party associated with a second vehicle. In a specific example, the vehicle monitoring systems disclosed herein may be mounted on semitrucks. The system may identify that a car serving as a car for hire (e.g., taxi, Uber, Lyft) was the cause of an atypical traffic event observed or experienced by a semi-truck with the driver monitoring system installed on it. That information could be sold, licensed, or otherwise reported back to the party managing the car for hire, such that the information about the car for hire causing an atypical traffic event can be known by the managing party. In this way, data about vehicles or fleets that do not have the systems disclosed herein actually on board may still be monitored. Such vehicles like cars for hire may be identified in a number of ways using visual data, such as markings on the car, license plate numbers, stickers in the windows, etc. In another embodiment, a managing party that receives information about its drivers may provide information about its vehicles which can be used to identify those vehicles on the road. In various embodiments, the driver monitoring systems may not be installed on any vehicle, but may still identify and report on atypical traffic events and those who caused them. For example, a driver monitoring system may be installed on a traffic light pole or fixture.

Combined Grading System

The aforementioned systems and methods for determining cause of traffic events and/or encouraging good driving behavior may include a general assessment system 260 that may be based on a set of modules 240. A combination of modules may determine the car and environment status using a mixture of cameras 212, inertial sensors 214, GPS 222, cloud data 224, profile data 230, which may include vehicle 234 and driver profiles 232, and other inputs 210. These inputs may then be the basis of a plurality of inferences 240 and grades 260 based on engineered rules.

Alternatively, or in addition, the grading system 260 that is based on the car and environment status determining systems may be a machine learned model that was trained to match expert human labeled grading scores to environment values. The machine learned model may be applied to obtain a subset of grading values 260 or a combined value 280. In comparison to engineered rules, the machine learned grading system may evaluate grading features for complex scenarios that may not have been considered by the engineers that designed the behavior assessment rules.

In one configuration, the visual system 212 and grading systems 260 and 280 may be trained end-to-end. Rather than training the visual system for cars 248, pedestrians, lanes 250, distances, and so forth, and then a system on top to match grading scores 260, the system may be trained end-to-end such that grading scores 260 are computed directly from sensory data 210. Still, the training procedure may start with training certain subsystems 240 independently, and then performing full end-to-end training on a combination of subsystems 240 and sensory inputs 210, such as by back propagation. This training procedure may result in the detection of more fine-tuned visual features which may be the basis for more accurate driver assessment scores 260.

Determining Causation of Traffic Events—Tailgating

A traffic event may be an inertial event (such as a hard-braking event, a fast acceleration, a swerving maneuver, and the like), may be a traffic violation (such as failing to come to a complete stop at a stop sign, running a red light, crossing a double yellow line on a road, and the like), may be defined by a person (such as a fleet safety manager defining a traffic event through the specification of a time and/or place of interest, a Driver indicating that unsafe driving is occurring in his or her vicinity, a traffic officer viewing a video feed remotely, and the like). In one example, a safety officer may specify a traffic event as a period of time when a specified automobile passed through a specific intersection, the specification of which may be based on a report of unsafe driving.

Traffic events may be caused by the ego-driver (who may be the driver being monitored), may be caused by another driver (who may be in the vicinity of the ego-driver), may be caused by something in the environment (such as road debris), or may have an unknown cause. For example, a traffic event may be specified as a time that the ego-driver slammed on the brakes. If the ego-driver slammed on the brakes because another driver suddenly turned left in front of the ego-driver without signaling, then the cause of the traffic event may be assigned to the other driver. If, however, the ego-driver slammed on the brakes so that he could bring his car to a complete stop at a stop sign that had he had failed to notice earlier, but that had been clearly visible for some time, then the cause of the traffic event may be assigned to the ego-driver.

For systems and methods for determining cause of traffic events in accordance with certain aspects of the present disclosure, the use of many different types of sensors is contemplated. In the first example above, in which another driver turns left in front of the ego-driver, a windshield mounted camera may be used to identify the other car. Alternatively, or in addition, RADAR and/or LiDAR may be used to identify the other car. The movements of the other car may also be determined through data messages passed directly or indirectly between the ego-driver's car and the other car that may indicate position and/or path of travel for one or both cars. In addition, the movements of the ego-car and the other car may be determined based on a stationary camera or cameras that have a view on the scene of the traffic event, or may be based on a camera that is affixed to a third car passing through the scene of the traffic event.

In the second example above, in which the ego-driver slammed on the brakes at a stop sign, the cause may be assigned to the ego-driver. A car mounted camera may aid in this determination, but methods of determining cause of traffic events that do not rely on cameras are also contemplated. For example, a method of determining position, such as GPS and/or dead-reckoning from a known location, in conjunction with previously or subsequently obtained information about the position of the stop sign, may be used together to determine that the hard-braking event may have occurred in response to the stop sign at the known or estimated stop sign position.

According to certain aspects of the present disclosure, determining cause of traffic events may be rule-based, and/or may be based on the output of a neural network trained on labeled data. For example, the output of a neural network may be used to identify other cars in the vicinity. FIGS. 3A-D and FIGS. 4A-D illustrate examples of systems and methods of determining causation of traffic events based on rules in combination with outputs of a neural network. Determinations of cause of traffic events based on rules and/or neural networks may also be used to train a second neural network to detect and/or characterize traffic events and/or determine cause of a traffic event.

Figure 3A:
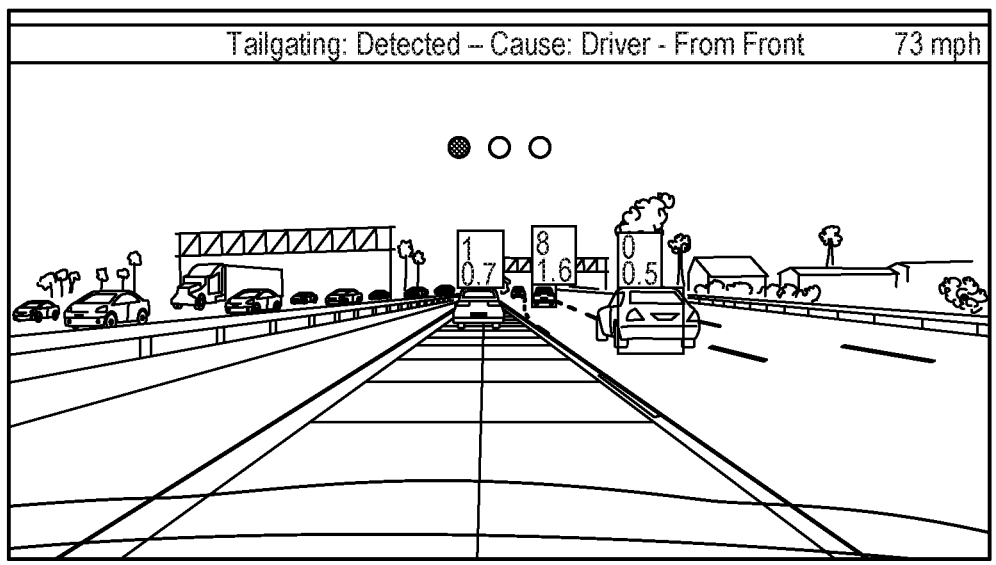
FIG. 3A illustrates an example of a system for determining cause of traffic events and/or encouraging good driving behavior in accordance with certain aspects of the present disclosure.

FIG. 3A illustrates an example of determining cause of traffic events in which tailgating is detected and the cause is assigned to the ego-driver (or "Driver"). In the video frames shown in FIGS. 3A-D and FIGS. 4A-D, the type of event and the determined cause is shown on the top of the video frame, along with additional information. In FIG. 3A, the type of event is "Tailgating", the determined cause is "Cause: Driver" and the additional information is "From Front".

In this example, certain aspects of the present disclosure were used to detect and track other cars, including a car that is in the same lane as the Driver. In FIG. 3A, three cars travelling in the same direction as the Driver are tracked. Each tracked car has an empty colored square, which may be called a "bounding box", drawn over the location of the tracked car, along with a filled square containing information about the car. In this example, a car ID is displayed in the top line of each filled square, and the distance to that car (in which the distance has been converted to time based on the distance and the Driver's travelling speed) is displayed in the next line of each filled square. From left to right, the tracked car IDs are "1", "8", and "0", and the determined following distances in time is "0.7", "1.6" and "0.5" seconds, respectively.

The distance may be determined, for example, based on methods described above and/or in the incorporated applications, or by other means, such as by helicopter, autonomous aerial vehicle, smart pavement, and the like. The determined speed of the driver's car, which may be used to determine a following distance in time, is displayed at the top right of the video frame. In FIG. 3A, the determined speed of the Driver is 73 miles per hour.

In one embodiment of the present disclosure, "tailgating" may be configured to mean that the Driver is travelling at an unsafe distance behind another car in the same lane as the Driver. In another embodiment of the present disclosure, "tailgating" may be configured to mean that the Driver is travelling within a range of safe following distances at which the Driver's may benefit from reduced wind resistance and thereby improve fuel efficiency. FIGS. 3A-D and FIGS. 4A-D illustrate examples from an embodiment of the present disclosure in which "tailgating" is configured to mean that the Driver is traveling at an unsafe distance behind another car in the same lane.

In FIG. 3A, the determined following distance to the car with ID "1" (car ID 1) is 0.7 seconds. A tailgating threshold may have been determined previously based on a user specification, and/or may be based on data that indicates what may be considered a safe following distance for a given driver and/or for a given road condition and/or for a given region. In this example, tailgating is configured to mean travelling at an unsafe distance behind another car and configured with a minimum safe following distance of 1 second. Since car ID 1 is in the same lane and is spaced at a following distance that is substantially below 1 second (0.7 seconds), a traffic event is detected. The bounding box around car ID 1 may be colored red in a color display, and the filled square above the detected car may also be colored red, to identify which car is being tailgated. In addition, a red/yellow/green indicator displayed in the top center portion of the video frame shows a filled red circle, an unfilled yellow circle and an unfilled green circle. In the black and white drawing in FIG. 3A, the three indicator circles are depicted in black and are distinguishable by position, with the red circle filled and on the left, the yellow circle in the middle, and the green circle on the right. In this configuration, the red/yellow/green indicator indicates an unsafe driving situation (red, left), driving that is close to the threshold of unsafe (yellow, middle), and safe driving (green, right), depending on whether the red, yellow, or green circle is filled, respectively. The red/yellow/green indicator in FIG. 3A indicates that an unsafe traffic event (tailgating) has been detected.

As can be seen in FIG. 3A, other cars may be at an even shorter following distance, but may not be considered participants in a tailgating event. For example, car ID 0 is shown as having a following distance of 0.5 seconds. However, car ID 0 is not in the same lane as the driver. Instead, car ID 0 is in the lane to the right of the driver. In this example, since the Driver's car is in the left most lane, and there is a car within the threshold for tailgating in the right lane, the Driver does not have the option to change lanes at the time of the tailgating event.

In FIGS. 3A-D and FIGS. 4A-D, detected lane markings are drawn as heavy black lines at locations corresponding to the left and right lane boundaries of the current lane of the Driver. In addition, the determined future path of travel, as determined according to certain aspects of the APP methods described above, is depicted as a grid that tapers to a narrower width from the bottom to the middle of the video frame.

Figure 3B:
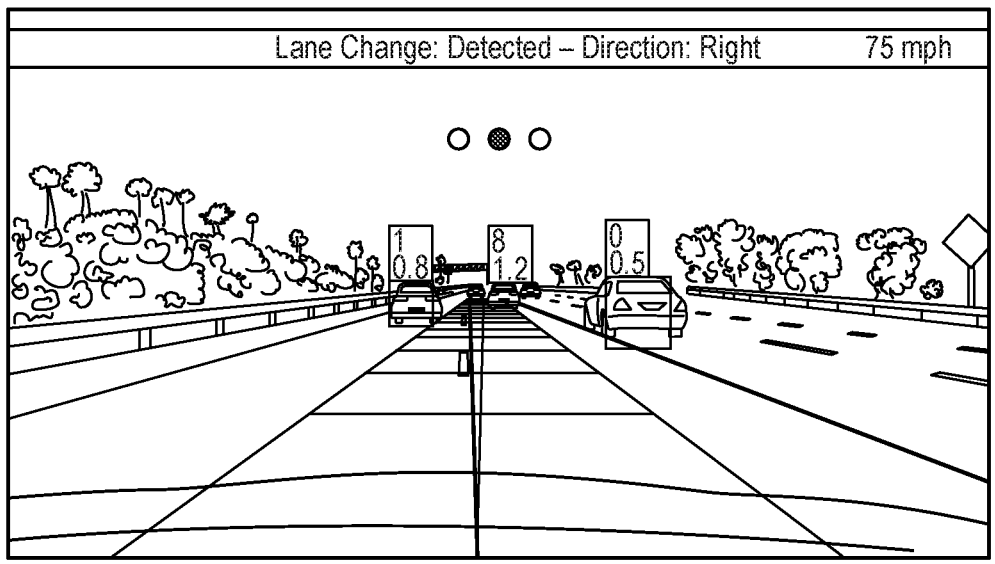
FIG. 3B illustrates an example of a system for determining cause of traffic events and/or encouraging good driving behavior in accordance with certain aspects of the present disclosure.

A short time after the event shown in FIG. 3A, the driver changes lanes. FIG. 3B shows the video frame captured from the camera attached to the Driver's car as the Driver is changing from the left lane to the lane formerly occupied by cars with IDs 0 and 8. As can be seen, car ID 0 has also moved over one lane since the video frame shown in FIG. 3A.

The detection of a lane change may be based on the locations of the detected lane boundaries, as shown in heavy black lines. In FIG. 3B, the left lane boundary intersects the bottom of the video frame near the center of the frame. The right lane marking would intersect the bottom of the video frame off to the right of the frame. Given the known or inferred orientation of the camera with respect to the body of the car (which may be inferred from the portions of the hood of the Driver's car in the bottom of the frame or which may be calibrated based on acquired video frames) these lane boundary positions may be used to determine that the car is crossing a lane boundary into another lane.

In addition, or alternatively, the relationship between the detected lane boundaries and the vanishing point (VP) to which the detected lane boundaries point may be used to determine that the car is changing lanes. For example, the right lane boundary in FIG. 3A becomes the left lane boundary in FIG. 3B. In FIG. 3A, the detected right lane boundary intersects the bottom of the video frame at a horizontal position that is substantially to the right of the vanishing point. In FIG. 3B, however, the same lane boundary (which is now the left lane boundary instead of the right lane boundary as it was in FIG. 3A) intersects the bottom of the video frame at a position that is substantially similar to the horizontal position of the vanishing point. This change of the relative positions of lane boundaries and the vanishing point of the detected lanes may be used to determine that a lane change has occurred. The detected lane change is indicated in the text box near the top of the video frame as "Lane Change: Detected—Direction: Right".

In this example, after the lane change, the following distances of the three tracked cars are 0.8, 1.2, and 0.5 seconds for the cars that are in the lane to the left of the Driver, in the same lane as the Driver, and in the lane to the right of the Driver, respectively. Because the car that is in the same lane as the Driver (car ID 8) is more than 1 second away from the Driver, there is no detected tailgating event in this frame. Still, the following distance to car ID 8 is 1.2 seconds, which may be considered close to the threshold. The red/yellow/green indicator in the center near the top of the frame therefore indicates a "yellow" state, meaning that the following distance is close to the threshold for a traffic event. In this example, the Driver is exhibiting driving behavior that is close to the configured threshold for tailgating.

Figure 3C:
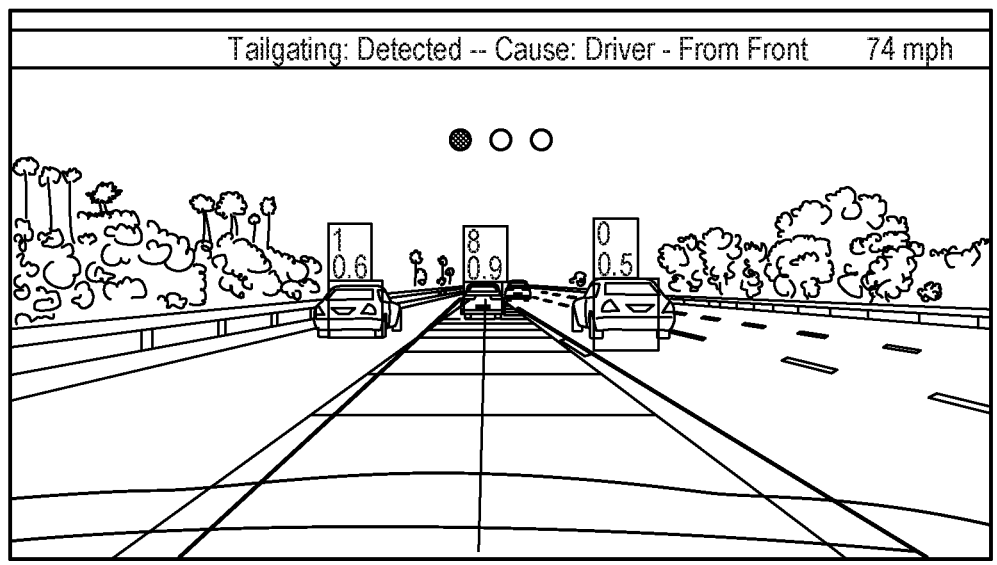
FIG. 3C illustrates an example of a system for determining cause of traffic events and/or encouraging good driving behavior in accordance with certain aspects of the present disclosure.
Figure 3D:
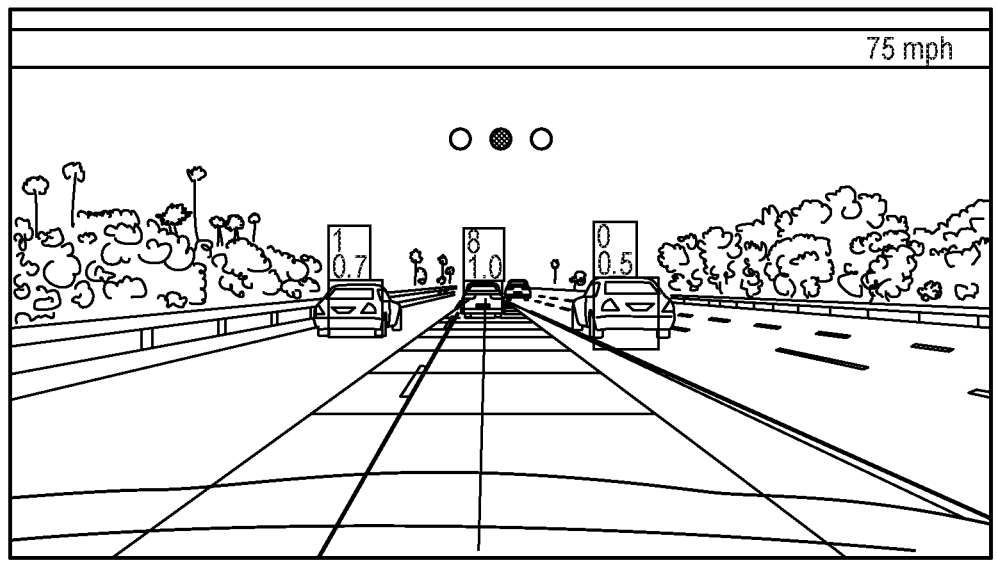
FIG. 3D illustrates an example of a system for determining cause of traffic events and/or encouraging good driving behavior in accordance with certain aspects of the present disclosure.

As shown in the video frame in FIG. 3C, which was captured a short time after the video frame shown in FIG. 3B, the Driver has been driving faster than car ID 8, and the following distance has decreased to 1.0 seconds. A short time later, as shown in the video frame in FIG. 3D, the following distance has now decreased to 0.9 seconds, and once again a tailgating event is identified. The cause of the traffic event (tailgating) shown in FIG. 3D is assigned to the Driver according to a configurable set of rules that are described in the next section.

Figure 4A:
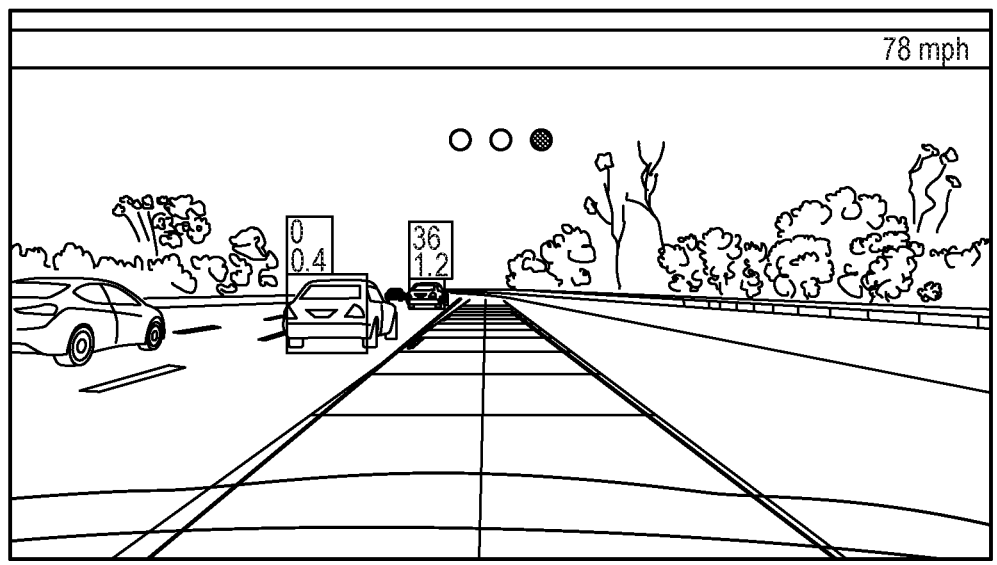
FIG. 4A illustrates an example of a system for determining cause of traffic events and/or encouraging good driving behavior in accordance with certain aspects of the present disclosure.

FIGS. 4A-D illustrate an example of a tailgating event that is not the cause of the Driver. FIG. 4A, which depicts a video frame captured about 30 seconds after the video frames that are depicted in FIGS. 3A-D, shows that the driver is in the far right lane with no visible cars in the same lane. Car ID 0 and car ID 36 are detected and tracked in the lane to the left of the Driver. The distance to car ID 0 is 0.4 seconds and the distance to car ID 36 is 1.2 seconds. We can infer from these following distances that car ID 0 is tailgating car ID 36, since the difference is following times is (1.2 seconds−0.4 seconds=0.8 seconds) is substantially less than the configured threshold for tailgating (1.0 seconds). Still, the Driver in this example, which is the driver of the car to which the camera collecting the video frame is attached, is not exhibiting tailgating behavior. The red/yellow/green indicator, therefore, is in a green state (right-most black circle is filled), indicating that the Driver is exhibiting good driving behavior at this time.

According to certain aspects of the present disclosure, the Driver may be alerted that a car in an adjacent lane (for example, car ID 0 in FIG. 4A) is exhibiting unsafe driving behavior (tailgating), and/or may receive a positive reinforcement or positive driving assessment for avoiding the unsafe driver. The Driver may avoid and unsafe driver, for example, by slowing down and thereby increasing the following distance to that car, even though the that car is in an adjacent lane. Furthermore, an embodiment of the present disclosure may report the unsafe driving of another driver by sending a message to a centralized database. In addition, or alternatively, in the case that the observed car is a part of a recognized fleet of automobiles (such as a trucking line or a ride sharing network such as Uber or Lyft), an embodiment of the present disclosure may report the unsafe driving event to a safety manager responsible for the fleet of automobiles or to other interested party.

Figure 4B:
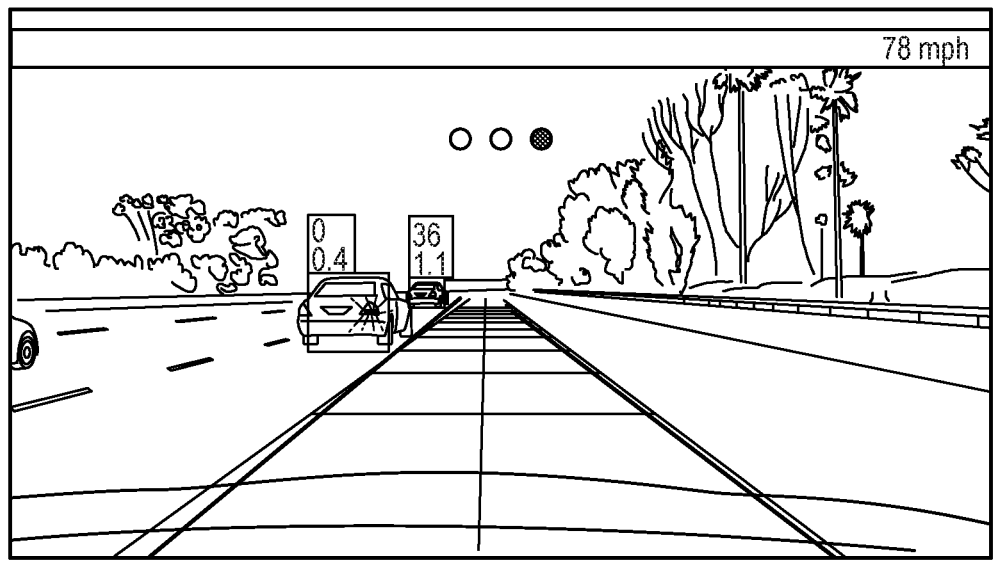
FIG. 4B illustrates an example of a system for determining cause of traffic events and/or encouraging good driving behavior in accordance with certain aspects of the present disclosure.

FIG. 4B, which includes a video frame that was captured shortly after the video frame shown in FIG. 4A, shows that car ID 0 has signaled an intention to change lanes into the Driver's lane.

Figure 4C:
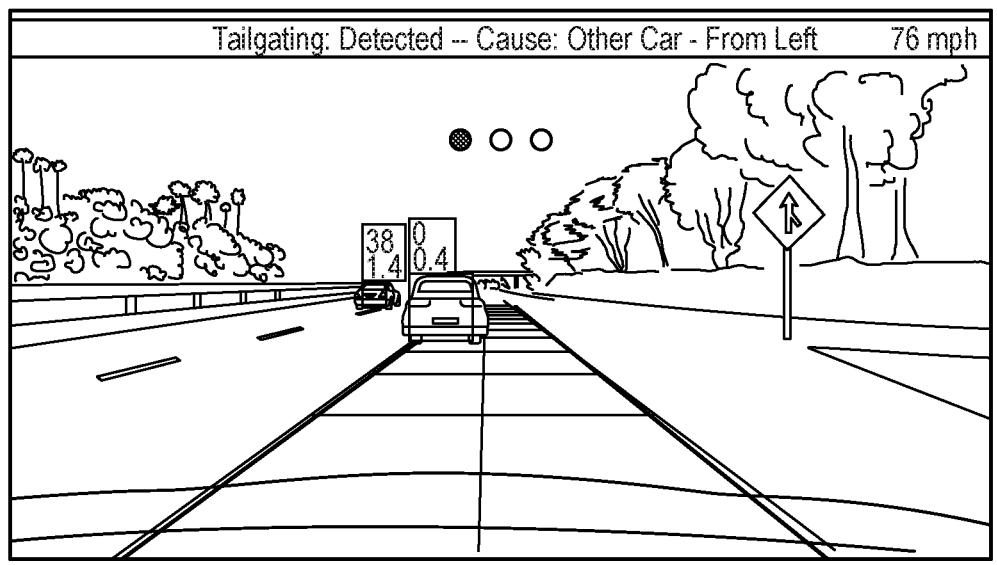
FIG. 4C illustrates an example of a system for determining cause of traffic events and/or encouraging good driving behavior in accordance with certain aspects of the present disclosure.

FIG. 4C, which includes a video frame that was captured shortly after the video frame shown in FIG. 4B, shows that car ID 0 has entered the Driver's lane from the left. The text banner near the top of the image indicates: "Tailgating: Detected—Cause: Other Car —From Left". The red/yellow/green indicator is in the red state, indicating the unsafe driving event. Unlike the example in FIGS. 3A and 3D, however, this unsafe driving situation was caused by the other car and not the Driver. In some embodiments of the present disclosure, events for which the cause is not attributed to the Driver may not impact an overall rating of the Driver's driving behavior. Additionally, video data associated with such events may not be transmitted wirelessly to a safety manager or other interested party in consideration of bandwidth or storage costs. An alternative embodiment of the present disclosure, however, may be configured so that a certain number of events caused by other drivers may negatively impact a Driver's overall driving behavior assessment, as a number of such events may indicate that the Driver tends to put himself or herself in the vicinity of unsafe driving events.

Figure 4D:
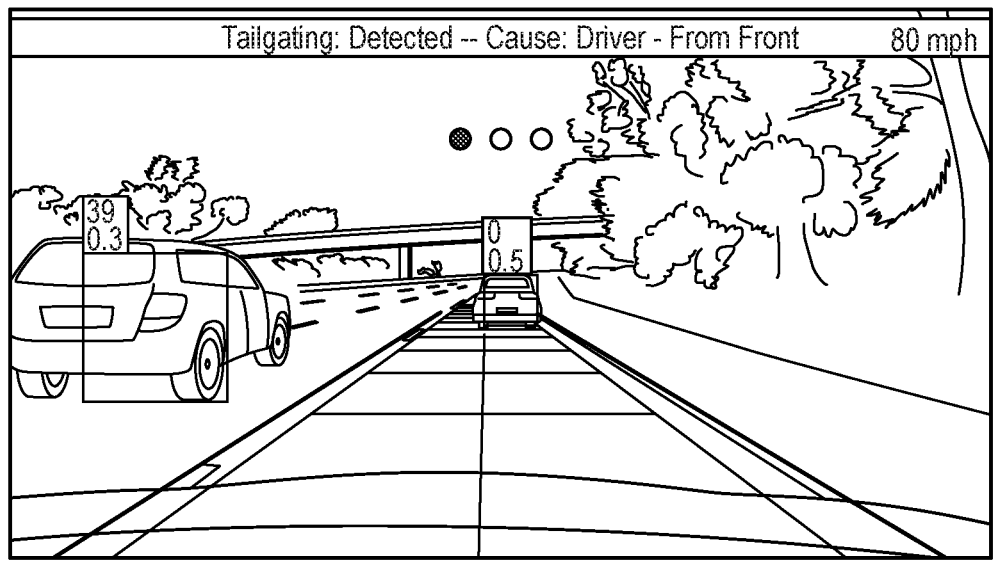
FIG. 4D illustrates an example of a system for determining cause of traffic events and/or encouraging good driving behavior in accordance with certain aspects of the present disclosure.

FIG. 4D, which includes a video frame that was captured several seconds after the video frame shown in FIG. 4C, shows that the Driver is still tailgating car ID 1, now at a following distance of 0.5 seconds. While the following distance has increased from 0.4 seconds to 0.5 seconds, the speed of the Driver has also increased from 76 mph to 80 mph. In accordance with a configuration of tailgating rules that are described in the next section, a new tailgating event is now detected and the cause is attributed to the Driver. In this configuration, if a tailgating event that is caused by another driver continues for more than 5 seconds, a new tailgating event is triggered that is now attributed to the Driver. In this example, when the Driver gets cut off, the cause may be initially attributed to the other driver. The Driver then has some time (for example, 5 seconds for the time that the other driver first entered the Driver's lane) to respond and create an appropriate following distance. If the Driver does not, then the cause for the persistent tailgating may be assigned to the Driver.

In some embodiments of the present disclosure, the relative speeds of the Driver's vehicle and another vehicle may be compared. In addition, the pedal actions (which may be determined from a bus (such as OBD2/CANBUS/J1939)), or may be inferred based on visual information, may be used to modify rules for determining cause. In one embodiment, the thresholds for determining the presence and/or severity of tailgating may be modified based on the relative speed of the cars. For example, if a Driver gets cut off but the relative speeds of the cars are such that the separation is increasing, then the Driver may be given more time to slow down or change lanes before a persistent tailgating event is assigned to the Driver. Similarly, if the pedal action or fuel flow of the Driver's car indicate that the driver has taken positive action to increase the following distance, then additional time may be allowed.

While FIGS. 3A-D and FIGS. 4A-D provide detail of determining cause of tailgating events, the cause of other traffic events are also contemplated. Furthermore, while FIGS. 3A-D and FIGS. 4A-D illustrate the functioning of an embodiment of the present disclosure that relies on a camera sensor, other sensors are contemplated. Embodiments that do not include camera sensors are also contemplated. For example, the detection of a traffic event may be based on inertial sensors, which may, for example, indicate a hard stop. In this case, the cause of the hard stop may be determined with the aid of a camera if, for example, the hard stop was caused by the sudden presence of a pedestrian or a bicyclist. A camera may not be necessary, however, if the hard stop is caused by a red light, and the driver's car records the presence of the red light based on a data message broadcast from the traffic light.

While FIGS. 3A-D and FIGS. 4A-D illustrate an example in which a lane change was determined based on visual cues, some embodiments of the present disclosure may infer lane changes based on inertial sensors and/or based on readings of a signaled lane change from the Driver's car and a corresponding movement of the steering wheel.

Causation Rules—Tailgating

The cause of a traffic event may be determined based on a configurable set of rules, based on the output of a neural network or other trained model, or may be based on a combination of rules and the output of a trained model. Determining the cause of the traffic events shown in FIGS. 3A-D and FIGS. 4A-D may be based on the following set of configurable rules.

In one embodiment, a tailgating event is detected first and then cause is assigned next. A tailgating event may be detected according to the following method. First, check that the Driver's speed is above a minimum threshold (for example, 15 MPH). This threshold may lessen the overall number of tailgating events associated, for example, with stop-and-go traffic in an urban center or in a traffic jam. Second, determine the distance in seconds to the closest actively detected car in front of the driver and in the same lane as the Driver. The lane of the Driver may be referred to as the ego-lane. Third, check that the lane tracking confidence is above a configurable threshold (for example, 0.4). In the illustrated examples, a version of the Advanced Path Prediction (APP) method that incorporates data concerning the future path of travel of the ego-car is used. The use of this version of APP may increase lane tracking confidence to a degree that the third step may be skipped. Next, if the following distance in seconds is less than a configurable threshold (for example, 1 second) for more than a configured number of frames (for example, 15 frames) or for more than a configured period of time (for example, 0.6 seconds), then a tailgating event is triggered.

After a tailgating event is detected, the cause of the tailgating event may be determined according to the following methods. First, if an ego-car (Driver's car) lane change is detected, cause is assigned to the Driver due to the lane change. For example, if there has been a lane change within a certain number of frames (for example, 30) and/or certain amount of time (for example, 1 second) by the Driver before a detected tailgating event. In some embodiments, the cause of a tailgating event may be assigned to the Driver if the Driver engages in a lane change within a specified time after the detection of a tailgating event (for example, within 30 frames and/or 1 second).

If the ego-car has not changed lanes within a configured number of frames or amount of time, then the cause of a tailgating event may be assigned according to the following method: First, determine the relative lane position of the car being tailgated from the time in the past that tailgating was not occurring. For example, for the tailgating event shown in FIG. 3D, determine the relative lane position of car ID 8 from the time or video frame corresponding to FIG. 3C. In this example, car ID was in the same lane as the Driver from the time/frame corresponding to FIG. 3C up until the tailgating event shown in FIG. 3D. If the other car was in the ego-lane since the last time that tailgating was not detected, attribute the Cause to the Driver, and specify additional information as "Driver from front". If there is no time/video frame in the available recorded data in which tailgating was not occurring, then attribute the Cause to "Unknown" and specify additional information as "new detect".

A cause may be "Unknown" if a car is already in a tailgating position when first detected. This may occur if, for example, an embodiment of the present disclosure is configured to record 1-minute clips and a tailgating event is already occurring at the beginning of a 1-minute clip. In addition, a cause may be "Unknown" if lanes markings were not tracked at a confidence level above a configured threshold at a short time prior to the detected tailgating event. This may occur on roads in which lane boundaries are not clearly marked or may occur during unusual lighting conditions. If lanes are not reliably tracked, there may be less certainty about whether the Driver changed lanes into tailgating car's lane, or whether the car being tailgated changed lanes into Driver's lane.

Continuing with the exemplary method of assigning cause to a tailgating event, if the tailgated car was in another lane at the last time/frame that tailgating was not occurring, then the tailgating event is attributed to the other driver. If the other driver entered the ego lane from the right lane, then attribute the cause to "Other Car" and specify additional information "Lane Change from Right". If the other driver entered the ego lane from the left lane, then attribute the cause to "Other Car" and specify additional information "Lane Change from Left". FIG. 4C illustrates an example in which another car (car ID 0) entered into the ego-lane from the left and thereby caused a tailgating event.

Determining Causation of Traffic Events—Hard-Braking, Slow Response

A traffic event may be determined based on inertial data collected at a vehicle. Examples of traffic events that may be determined based on inertial data include hard-braking, fast acceleration, swerving maneuvers, and the like.

Figure 5A:
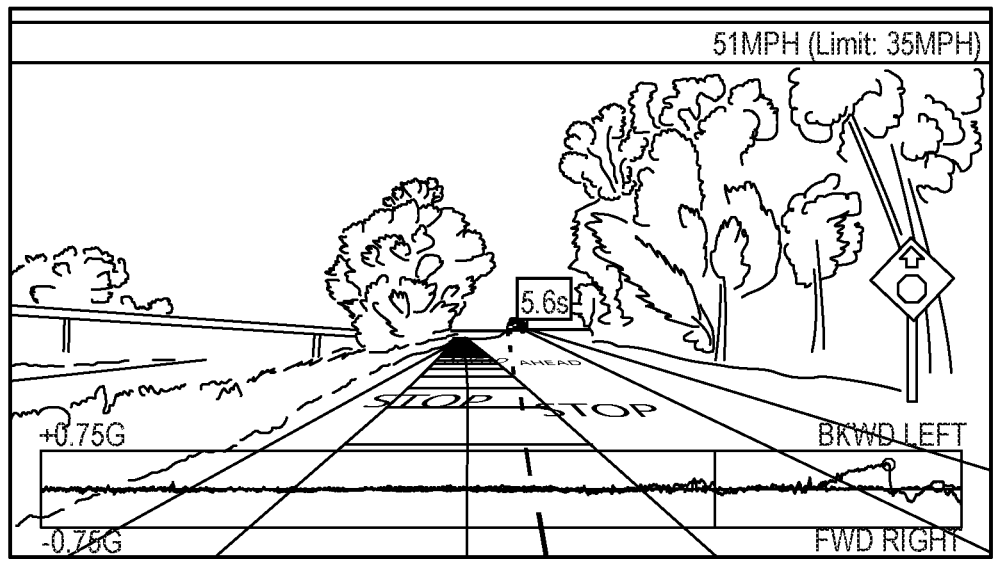
FIG. 5A illustrates an example of a system for determining cause of traffic events and/or encouraging good driving behavior in accordance with certain aspects of the present disclosure.

FIGS. 5A-D illustrate an example of a hard-braking event that is caused by the Driver. FIGS. 5A-D illustrate a sequence of annotated images captured by a camera located inside of a car and facing forward. In this sequence, the Driver of the vehicle is exiting a freeway. In FIG. 5A, a "stop ahead" sign is visible on the right side of the road. In addition, the text "STOP" and "AHEAD" are painted on the road. At the time that FIG. 5A was captured, the Driver was travelling at 51 miles per hour (MPH), which may be close to freeway speeds. The speed limit on the exit ramp is 35 MPH. There is one car visible ahead at a distance of 5.6 seconds (s) in front of the driver.

Figure 5B:
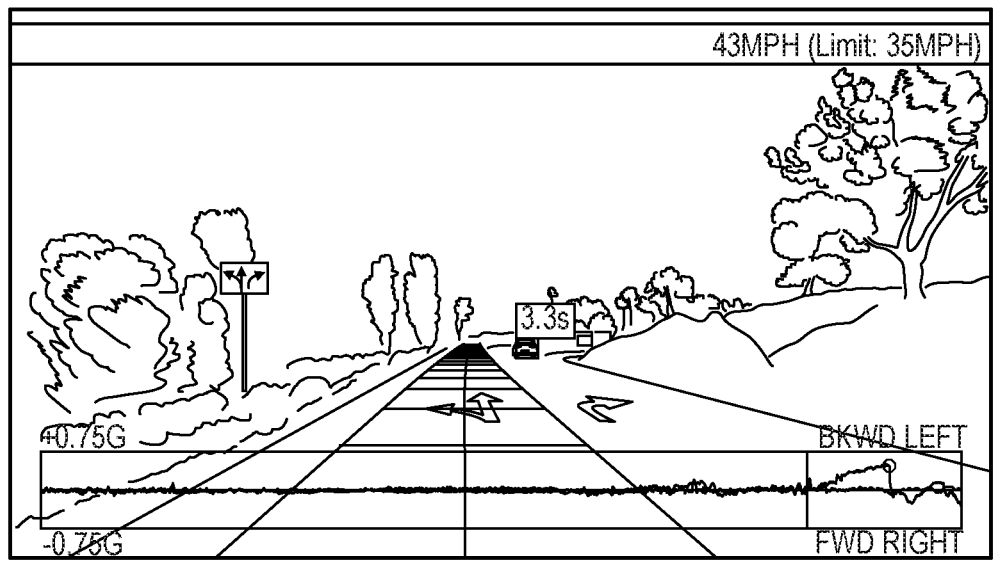
FIG. 5B illustrates an example of a system for determining cause of traffic events and/or encouraging good driving behavior in accordance with certain aspects of the present disclosure.

FIG. 5B illustrates the scene a few seconds later. In this image, the monitored Driver is approaching an intersection. Permissible turns are painted on the road in each of the two visible lanes. The car that was visible ahead of the Driver in FIG. 5A is now only 3.3 seconds ahead of the driver, indicating that the Driver had been travelling at a much faster speed in the intervening interval. The Driver's speed in now 43 MPH. From the accelerometer readings illustrated in the wide horizontal box at the bottom of the image, it does not appear that the driver has initiated braking yet. The decrease in speed may be attributable to the incline of the exit ramp.

Figure 5C:
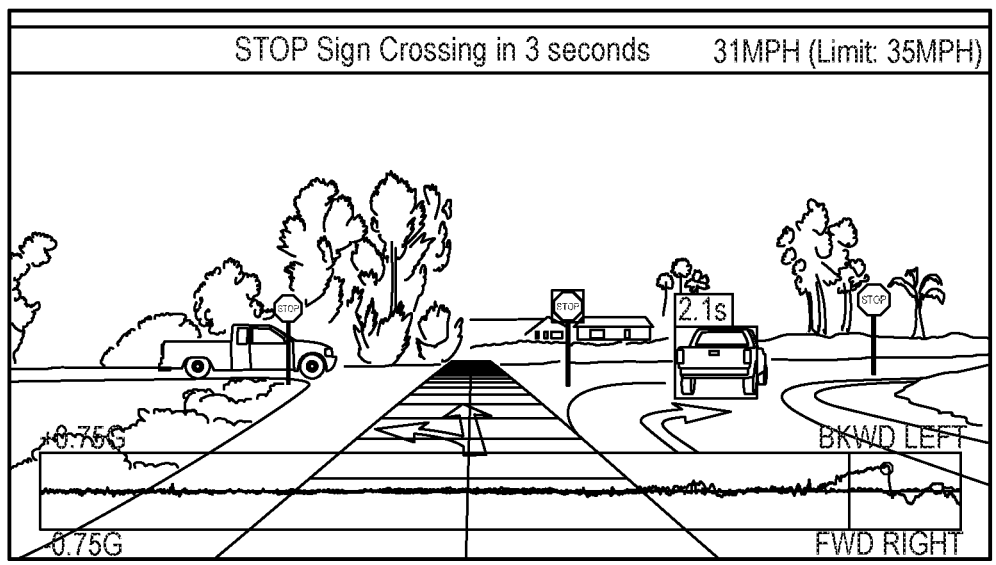
FIG. 5C illustrates an example of a system for determining cause of traffic events and/or encouraging good driving behavior in accordance with certain aspects of the present disclosure.

FIG. 5C illustrates the scene as the driver is nearing the intersection. Even through the driver is now very close to the intersection and very close to the visible stop sign, he is still travelling in excess of 30 MPH. In addition, it is now clear that there is a truck approaching the Driver's direction of travel from the left.

Figure 5D:
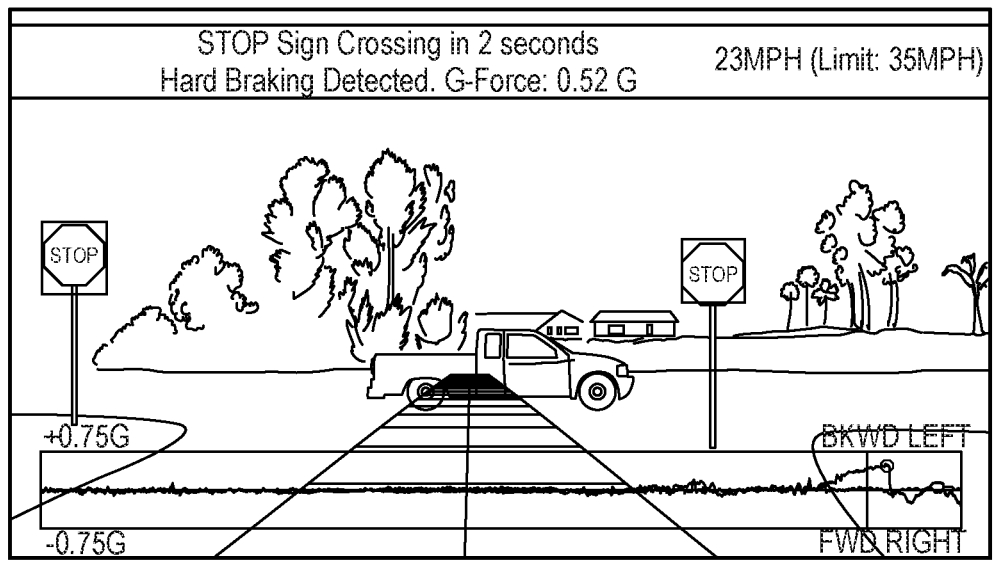
FIG. 5D illustrates an example of a system for determining cause of traffic events and/or encouraging good driving behavior in accordance with certain aspects of the present disclosure.

FIG. 5D illustrates the scene as the driver is in the middle of a hard-braking event. The speed is now 23 MPH and dropping quickly. The inertial reading in the wide box at the bottom of the screen shows a pronounced bump which comes to an abrupt end. The maximum G-Force detected was 0.52 G. According to a pre-configured threshold, which may be set to 0.35 G in one example embodiment, the observed high-G event may be classified to be an atypically severe hard-braking event.

In the example illustrated in FIGS. 5A-5D several methods for assigning the cause of the atypical traffic event to the monitored Driver are contemplated. In one example, the "Stop Ahead" sign and/or the "STOP AHEAD" lettering that is visible in FIG. 5A may be detected by a processor operating at or in the Driver's vehicle. The detection may be based on Computer Vision kernels, trained neural networks, and the like. After determining that a Stop sign will appear ahead based on the visual data, a system may then determine the point at which the driver initiated braking. In this example, breaking was initiated at a time that may be considered later than what might be expected of a typical driver.

A second method of determining cause for the hard-braking event illustrated in FIGS. 5A-D may be based on the geographic location of the monitored vehicle in combination with a map database. In this example, the location of the monitored Driver's vehicle may be determined to be on a known freeway exit that has a known stop sign at the end of the exit ramp. In this example, it may not be necessary for the processor at or in the vehicle to detect the "STOP AHEAD" sign or lettering. Instead, the presence of the stop sign may be inferred from the map data. In this example, the presence of the stop sign may be communicated to the monitored Driver via a head's up display, via a sound emitted by the device that houses the driver monitoring system, or by other means. In an example in which the presence of the stop sign inferred from map data is not communicated to the Driver, a driver monitoring system may determine the point in time at which the driver could have reasonably been aware of the stop sign.

Another method of determining cause for a hard-braking may be based on the relative speeds of the detected vehicles. In FIGS. 5A-C there is one vehicle detected and tracked in an adjacent lane to the driver. The distance, measured in seconds, to this vehicle dropped quickly, indicating the Driver was travelling much faster than nearby traffic for several seconds. The relative speed difference in this case may be another factor that could serve as a basis for attributing the cause of the hard-braking event to the monitored Driver.

In the hard-braking example shown in FIG. 5D, a system may also process available data to assign the hard-braking event to another driver. In FIG. 5C we can see a truck approaching the Driver's path of travel from the left. In FIG. 5D the truck is directly in front of the Driver's path of travel. Depending on the contextual information available at the intersection, such as the presence of stop signs in front of the monitored Driver or in front of the truck, as well as the behavior of other nearby drivers, it may be determined that the monitored Driver did not have the right of way in this scenario.

Determining Causation of Traffic Events—Hard-Braking, Pedestrian

FIGS. 6A-D illustrate an example of a hard-braking event that is caused by a road condition. In this example, the hard-braking event is caused by a pedestrian crossing the street at an unexpected location. FIGS. 6A-D illustrate annotated images captured by a camera located inside of a truck and facing forward.

Figure 6A:
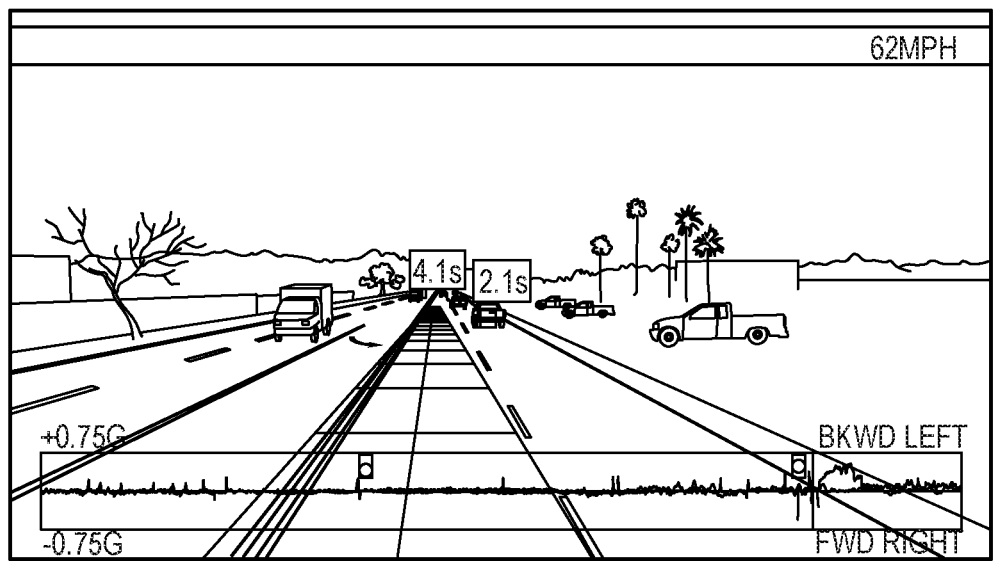
FIG. 6A illustrates an example of a system for determining cause of traffic events and/or encouraging good driving behavior in accordance with certain aspects of the present disclosure.
Figure 6B:
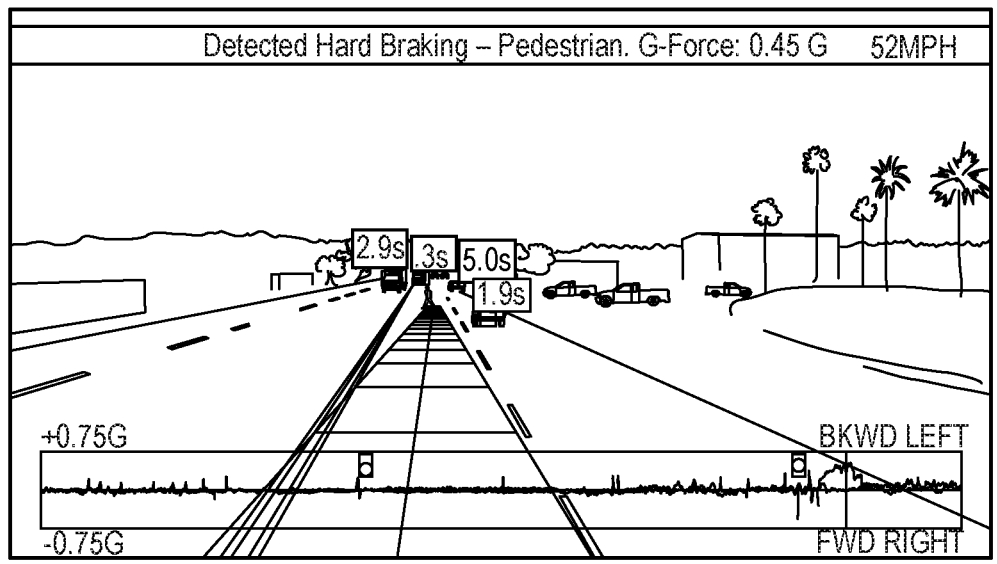
FIG. 6B illustrates an example of a system for determining cause of traffic events and/or encouraging good driving behavior in accordance with certain aspects of the present disclosure.

FIG. 6A illustrates an apparently normal driving scene with two lanes of traffic travelling in the direction of the monitored Driver, a central turn lane, and two lanes in the on-coming direction. On this wide road, the traffic is moving at a fast speed, with the monitored Driver travelling at 62 MPH. In FIG. 6B, a pedestrian can be discerned crossing the street. At this point the pedestrian is directly in front of the Driver. According to a distance estimate of a nearby vehicle, the Driver will arrive at the location of the pedestrian in 2.0 seconds. The Driver has already reduced his speed to 52 MPH and is still braking.

Figure 6C:
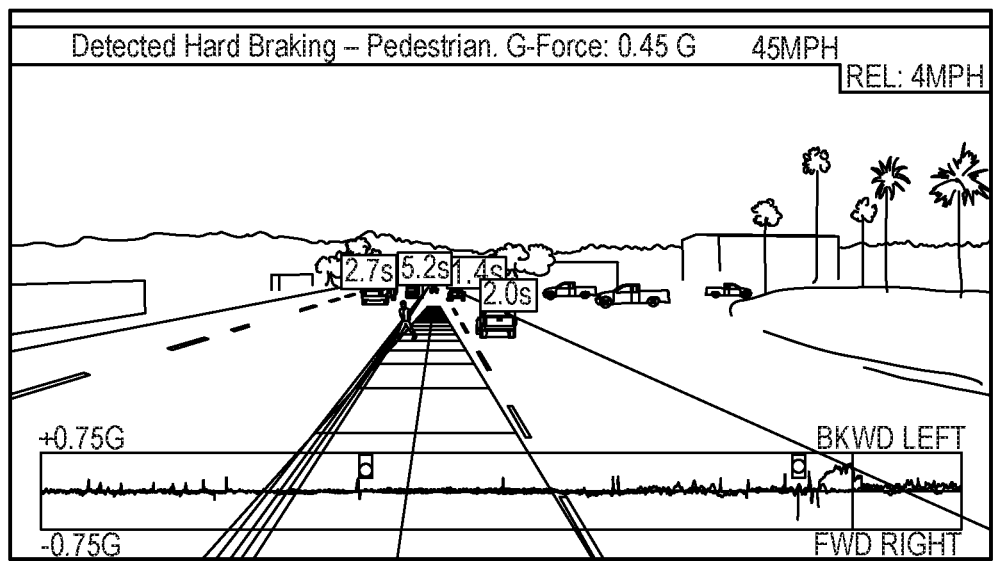
FIG. 6C illustrates an example of a system for determining cause of traffic events and/or encouraging good driving behavior in accordance with certain aspects of the present disclosure.
Figure 6D:
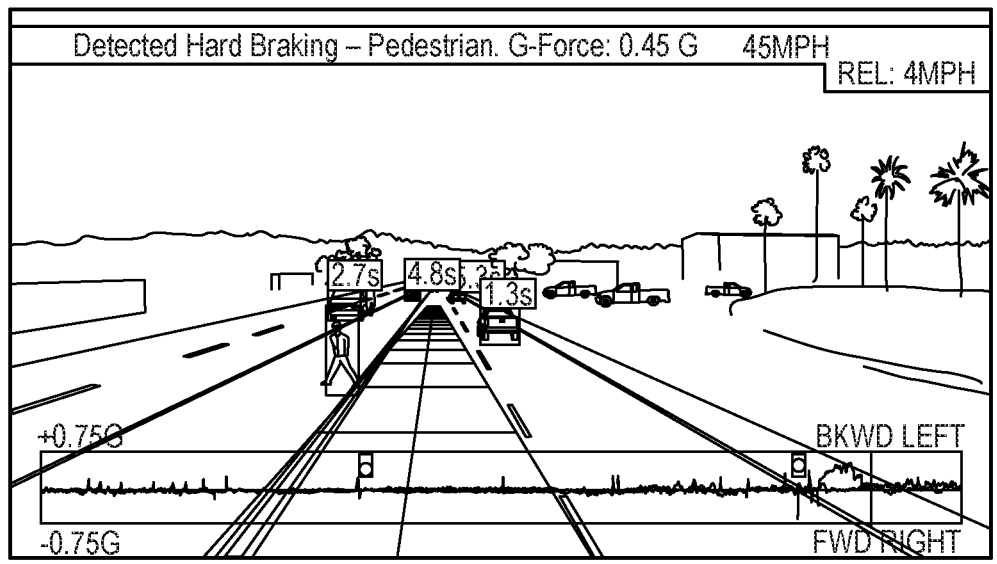
FIG. 6D illustrates an example of a system for determining cause of traffic events and/or encouraging good driving behavior in accordance with certain aspects of the present disclosure.

At the time that the image of FIG. 6C is captured, the monitored Driver's speed has further reduced to 45 MPH. The Pedestrian has almost cleared the monitored Driver's lane. The peak hard-braking forced was measured as 0.45 G. Shortly thereafter, as illustrated in FIG. 6D, the Pedestrian has cleared the Driver's lane and has entered the middle turn lane.

In the example shown in FIGS. 6A-D, a traffic event may be attributable to an unexpected road condition, such as the sudden appearance of a Pedestrian at a location far removed from a crosswalk. In this example, the cause of the hard-braking event may not be assigned to the Driver, since the Driver responded appropriately to the unexpected and atypical traffic event. According to certain aspects of the present disclosure, the determined cause of the event may impact a summary score of the Driver differently depending on the determined cause. For example, the impact on the Driver's score may be more positive than it would be if the determined Cause were the monitored Driver. In some embodiments, the impact on the monitored Driver's score as a result of the determined event may be positive overall. In the case of avoiding a collision with a Pedestrian, a successfully executed hard-braking maneuver may indicate alert and proactive driving. In this view, the hard-braking maneuver may be an event that a fleet manager or the like would want to acknowledge and encourage.

Determining Causation of Traffic Events—Hard-Braking, Emergency Vehicle

FIGS. 7A-D illustrate an example of a hard-braking event that is caused by an emergency vehicle. FIGS. 7A-D illustrate annotated images captured by a camera located inside of a truck and facing forward. The monitored Driver of the truck is travelling on a highway access road with one lane of traffic in the direction of the Driver and one lane of on-coming traffic. In addition, there is a narrow shoulder on either side of the road.

Figure 7A:
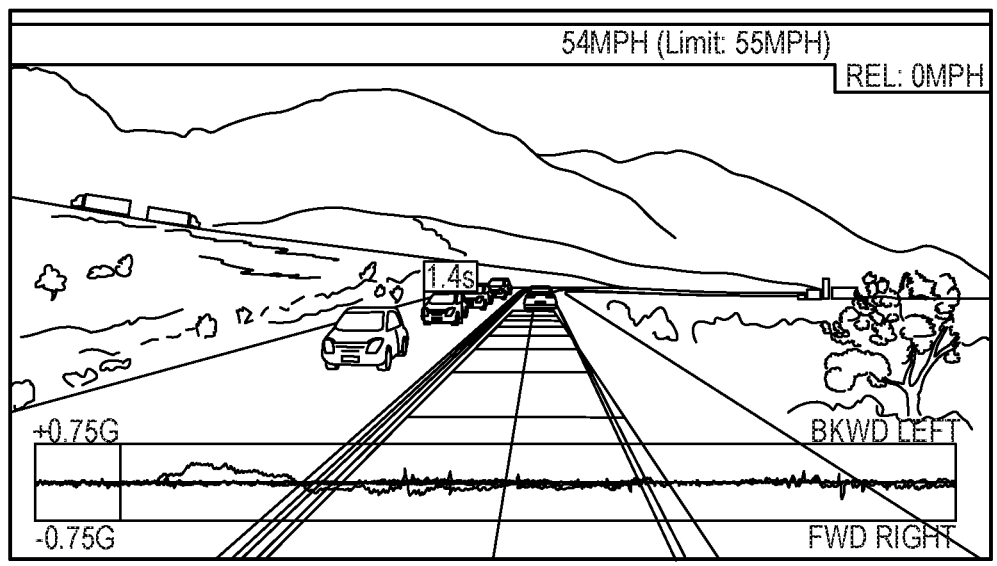
FIG. 7A illustrates an example of a system for determining cause of traffic events and/or encouraging good driving behavior in accordance with certain aspects of the present disclosure.
Figure 7B:
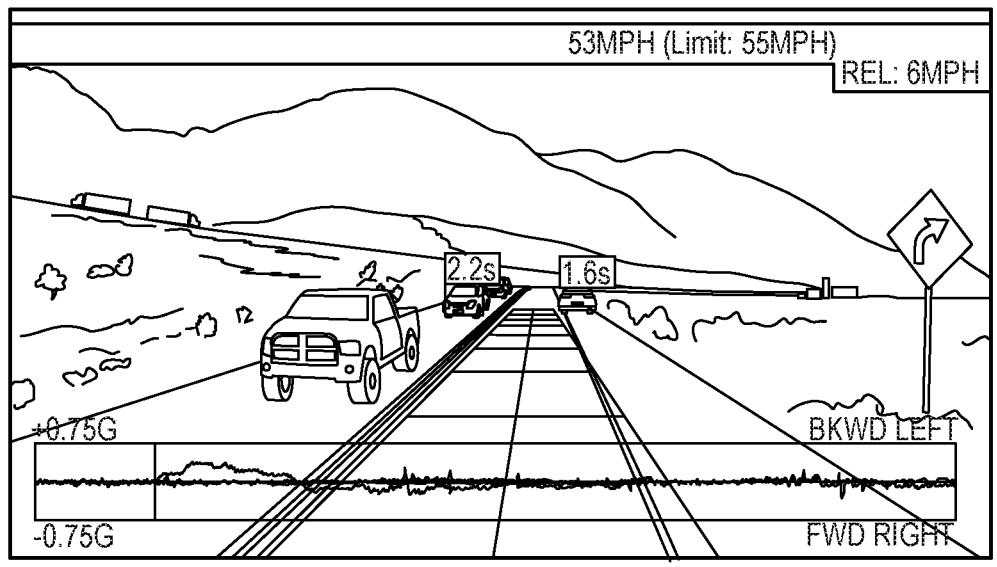
FIG. 7B illustrates an example of a system for determining cause of traffic events and/or encouraging good driving behavior in accordance with certain aspects of the present disclosure.
Figure 7C:
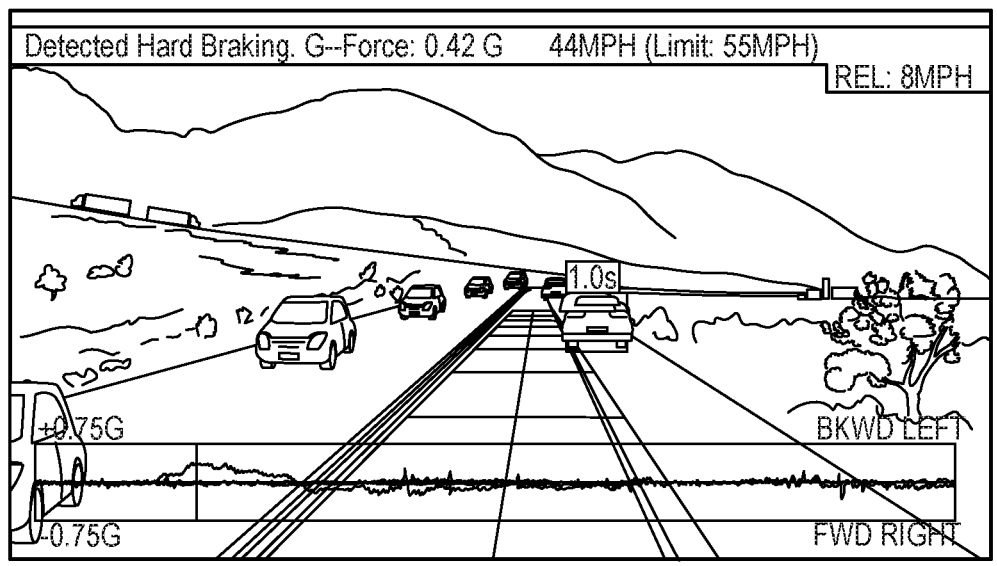
FIG. 7C illustrates an example of a system for determining cause of traffic events and/or encouraging good driving behavior in accordance with certain aspects of the present disclosure.
Figure 7D:
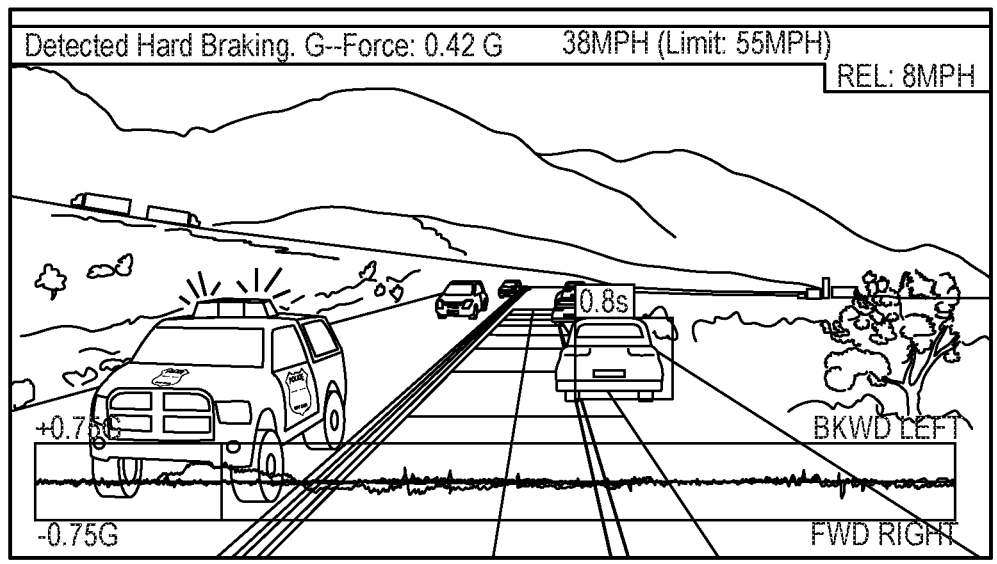
FIG. 7D illustrates an example of a system for determining cause of traffic events and/or encouraging good driving behavior in accordance with certain aspects of the present disclosure.

FIG. 7A illustrates a normal driving scenario. The monitored Driver is travelling at 54 MPH, which is the same speed as the other traffic in his lane. In FIG. 7B, the cars that are in front of the Driver and in the same lane are shown slowing down and pulling over to the right shoulder. The monitored Driver has begun to brake. In FIG. 7C, the monitored Driver has reduced his speed to 44 MPH and has moved over in the direction of the shoulder. The peak force of the hard-braking event was determined to be 0.42 G. The scene in FIG. 7C also shows that the drivers in the on-coming side of the road have also pulled over to the shoulder on that side. In FIG. 7D, the cause of the traffic event can finally be discerned. In this image, a police vehicle with an illuminated siren is shown driving past the pulled over traffic in the on-coming lane.

The cause of this kind of atypical traffic event may be determined by various means. In one example, the detection of a police vehicle at a time shortly after the hard-braking event may indicate that the cause of any detected traffic event could be attributable to the police vehicle. In another example, the presence of the emergency police vehicle may be determined based on an audio signal recorded by a microphone on a driver monitoring device. In another example, the presence of the emergency vehicle may be communicated via a dedicated short-range communications (DSRC) protocol. In another example, the pattern of driving behaviors exhibited by other visible or otherwise detectable drivers may be used as the basis for determining that the monitored Driver was responding to the presence of an emergency vehicle. In this example, the trajectories of other detected and tracked cars were consistent with traffic making room for an emergency vehicle to pass.

Determining Causation of Traffic Events—Hard-Acceleration, Emergency Vehicle

Figure 8A:
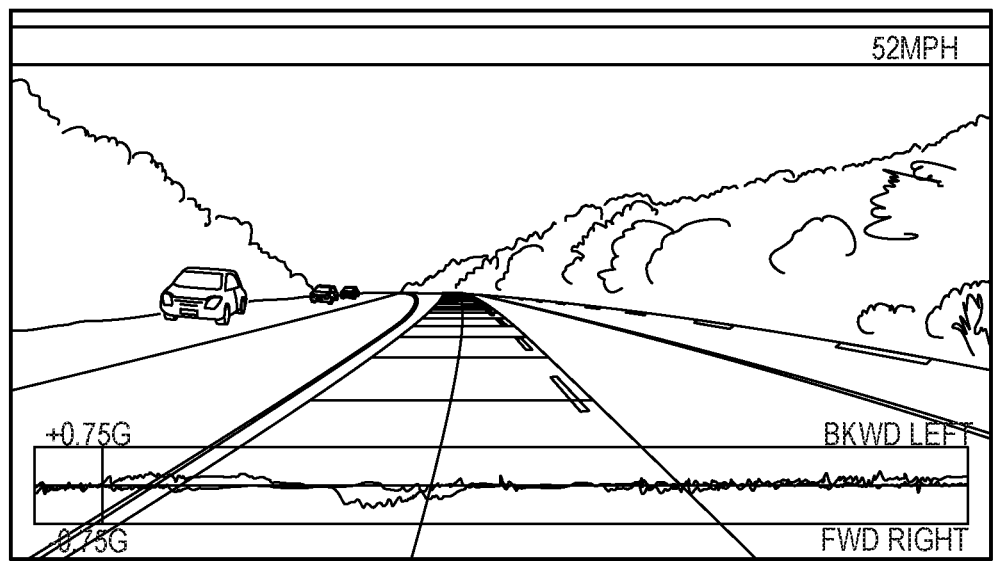
FIG. 8A illustrates an example of a system for determining cause of traffic events and/or encouraging good driving behavior in accordance with certain aspects of the present disclosure.

FIGS. 8A-D illustrate an example of an atypical hard-acceleration event that is caused by an emergency vehicle. FIGS. 8A-D illustrate annotated images captured by a camera located inside of a car and facing forward. FIG. 8A illustrates a normal driving scene. The monitored Driver is in the left lane of a two-lane road that is separated from on-coming traffic by a cement divider. The road leads to a highway and has a wide shoulder. The Driver is travelling 52 MPH.

Figure 8B:
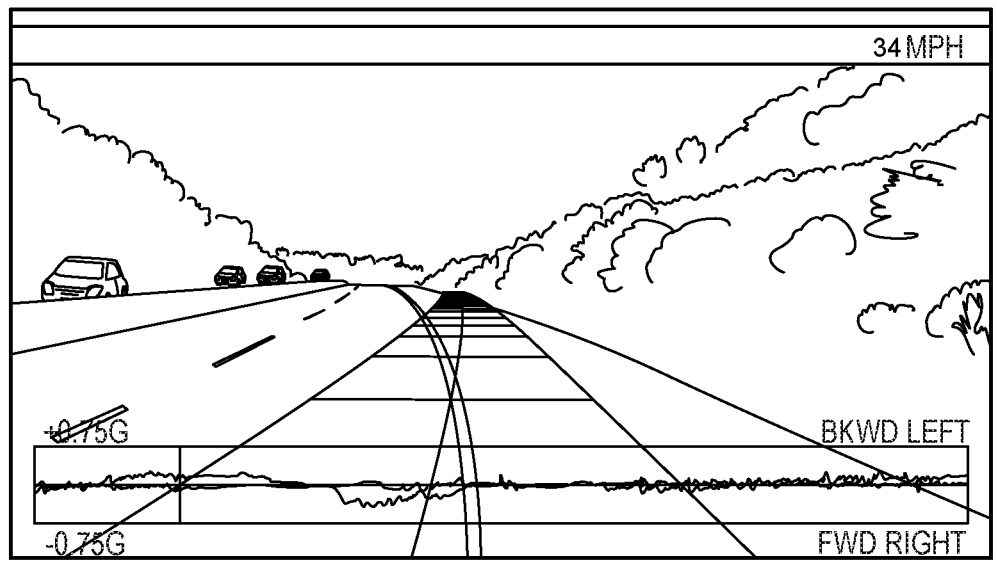
FIG. 8B illustrates an example of a system for determining cause of traffic events and/or encouraging good driving behavior in accordance with certain aspects of the present disclosure.
Figure 8C:
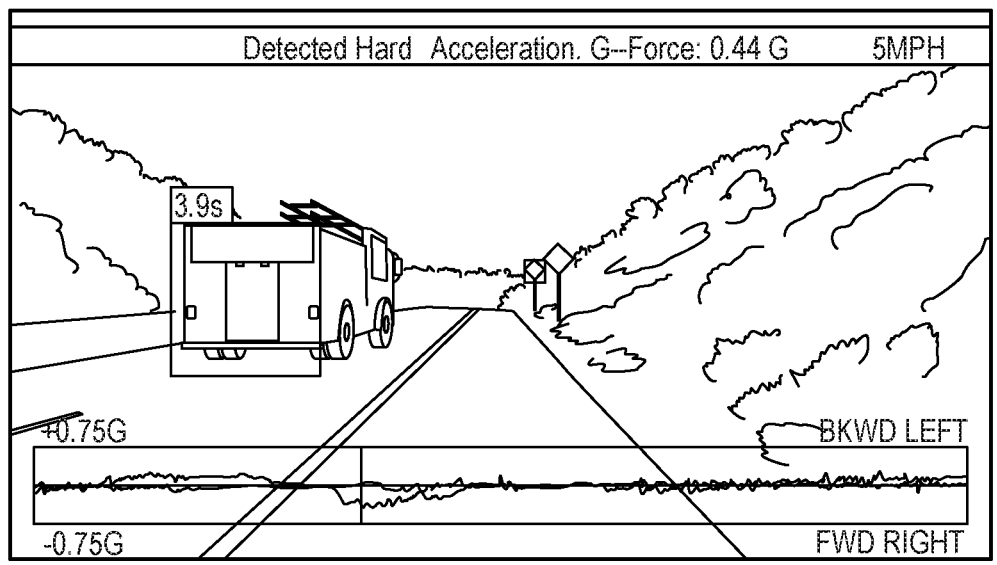
FIG. 8C illustrates an example of a system for determining cause of traffic events and/or encouraging good driving behavior in accordance with certain aspects of the present disclosure.
Figure 8D:
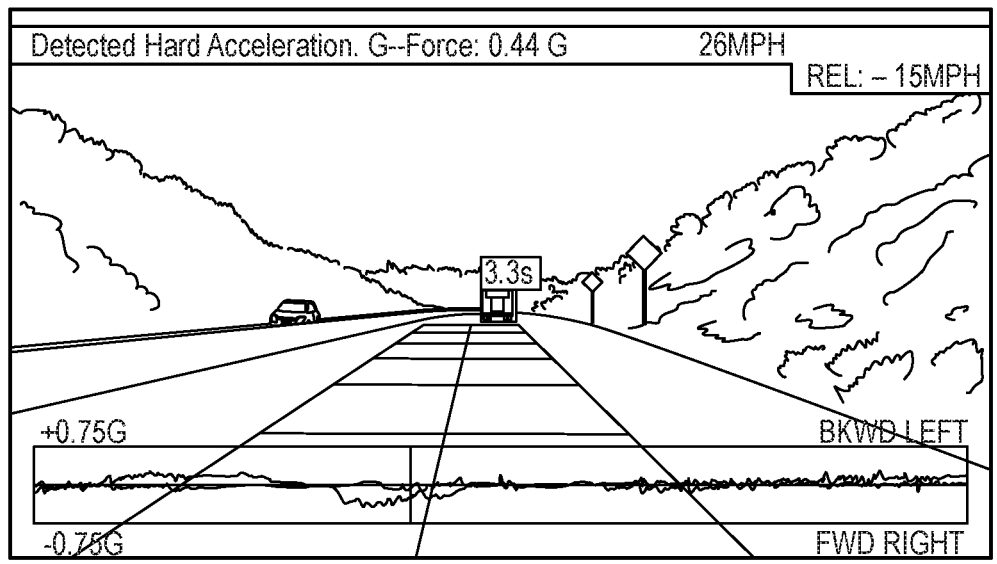
FIG. 8D illustrates an example of a system for determining cause of traffic events and/or encouraging good driving behavior in accordance with certain aspects of the present disclosure.

The image in FIG. 8B indicates that the Driver has changed lanes twice to get over to the shoulder. In addition, he has been braking steadily for several seconds and is now travelling 34 MPH. The Driver did not brake hard enough to trigger the detection of a hard-braking traffic event. In FIG. 8C the Driver is starting to accelerate again from rest, traveling 5 MPH on the shoulder. The cause of the Driver's maneuver is now visible as a fire truck races by. In FIG. 8D, now that the fire truck has safely passed, the monitored Driver has returned to the road. At this point, the monitored Driver has to quickly regain Highway speed. In doing so, he accelerates with a detected maximum force of 0.44 G. According to previously determined thresholds, this triggers a hard-acceleration traffic event.

As with the hard-braking event illustrated in FIGS. 7A-B, there are several methods contemplated to determine the cause of this hard-acceleration event. For methods that rely on visual data, a system in accordance with the present disclosure may detect the fire-truck and determine that it is an emergency vehicle. Because it appeared a short time before the hard-acceleration event, the driver may be excused for the hard-acceleration.

Learning Causation

According to certain aspects of the present disclosure, determining cause of traffic events may be based on a learning-based causation model. According to certain aspects, a multi-layer perceptron may be trained on supervised training data to generate causation labels. Alternatively, a video caption generation system may be trained on a series of frames. The video capture generation system may be based on a Recurrent Neural Network (RNN) structure, which may use Long Short-Term Memory (LSTM) modules to capture temporal aspects of a traffic event.

The data used to train a learned model may be generated by a rule-based approach, such as described above. These labels may be accepted, rejected, or corrected by a human labeler. According to certain aspects, inputs from fleet safety officers may be utilized. For example, a fleet safety officer may correct a given causation label, or may agree with labels that are provided by a rule-based and/or neural network based system. These labels may then be used to bootstrap from the rule based approach to a machine learned model that exhibits improved performance.

Driver Safety Monitoring in Fleets

In the United States, the Occupational Health and Safety Administration (OSHA) may require that employers provide their employees with a safe working environment and comply with federal safety regulations. While OSHA may enforce these regulations through worksite inspections and recording requirements, it often falls to employers to create an organizational climate that prioritizes safety, even in the face of competing organizational goals. A positive safety climate may exist when employees believe that safety is valued and expected by their organization. A positive safety climate may lead to increased safety performance and, as a result, reduced workplace accident and injury rates. Conversely, a poor safety climate may be linked to increases in workplace accident and injury rates as well as accident underreporting. Research emphasizes that managerial commitment is key to the promotion, maintenance, and reinforcement of a positive safety climate. All levels of management, from senior executives to frontline supervisors, may publicly commit to, communicate, and treat safety as a priority. They may effectively do so through a safety program that is designed to recognize and reward appropriate safety behaviors.

Fleets may recognize and reward drivers based on time/mileage based milestones. For example, a Safety Award Program may recognize driver associates who operate without a preventable accident. Awards, which may include pins, hats, patches, and jackets, may be given after 6 months, 1 year, and then every year thereafter.

A "Millionaires" Program may recognize driver associates who have driven at least one million miles without a preventable accident. Qualifying driver associates may receive a prize package and a personalized plaque that may be displayed prominently in Prime's Hall of Fame. The program may specify different levels. For example, a "Gold Level", may indicate a highest level of safety achievement, may be awarded to those who have driven a million miles without a preventable accident while working for one carrier. As another example, a "Silver Level" may be awarded to driver associates who have accumulated a million miles or more throughout their driving career at various carriers.

Existing driver monitoring solutions, such as Lytx/Drivecam and SmartDrive, may position their products to reduce risk and collision frequency by focusing on reducing the frequency of negative driver behavior events. With these systems, a fleet manager may identify risky driving behavior and may seek to correct driving skills through coaching. Both Lytx and SmartDrive derive a "score" based on triggered inertial events and visual observations. Neither system considers positive factors relating to driving compliance, positive performance and good driving.

Encouraging Good Driving Behavior

According to certain aspects of the present disclosure, a driver monitoring system may consider positive factors. These factors may contribute to a system of encouraging good driving behavior. An embodiment of certain aspects of the present disclosure may be referred to as DRIVERI™. A DRIVERI™ system may serve as a driver advocate, by providing fleets with systems and methods to recognize and reward their drivers for exhibiting good driving behavior.

Current driver monitoring systems may equate an absence of negative driving event detections with good driving. However, time spent outside of dangerous events may be made up of many moments of at-risk driving that are not dangerous to varying degrees. For example, there may be a range of driving between safe driving and proactively courteous driving.

A system that analyzes driving behavior based exclusively on the absence of negative traffic events may not accurately consider time that does not include driving at all. According to some systems, a driver who experiences one negative driving event in twenty minutes of driving may be considered as safe as a driver who experiences one negative driving event over the course of an eight-hour driving shift. Furthermore, systems that are based on the detection of negative driving event may emphasize the most dangerous driving behaviors exhibited by a driver, and may fail to properly recognize and reward safe and courteous driving.

Certain aspects of the present disclosure may be applied to create awareness of the portion of a driver's day that may be under-recognized by existing driver monitoring technologies. A system in accordance with the present disclosure may affirmatively analyze time intervals to quantify different aspects of safe driving. A time interval of safe driving may be defined not just as an absence of a negative event (such as a hard-braking event), but instead may be defined based on a number of pre-configured criteria. Examples of such criteria include maintaining proper lane position, using lane change indicators, making room for vehicles stopped on the shoulder, and the like. If a driver is exhibiting all of the desired features, he may be considered to be driving in the GreenZone™.

Unlike a system based on detecting negative events, a GreenZone™ system may serve as a basis for positive reinforcement. For any system of driver monitoring, it may be desirable to increase good, safe, and courteous driving, and also decrease negative driving events, such as collisions, hard-braking, and the like. A system based on punishment for detected negative behaviors may attempt to stop negative driving behaviors. Such a system, however, may not encourage specific good driving behaviors. In addition, such a system may fail to recognize at-risk driving situations which do not result in a negative driving event. While being in a situation in which an accident is likely may not be as undesirable as being in an actual accident, for a driver who frequently finds himself in situations for which an accident is likely, it may only be matter of time.

By focusing on positive behaviors, instead of or in addition to negative behaviors, the dynamic between a fleet manager and a driver may change. Rather than focusing exclusively on collisions and near-collisions, with GreenZone™ monitoring, a fleet manager may be able to point out expert maneuvers by expert drivers in the fleet. Such recognition may strengthen the relationship between excellent drivers and a trucking company. In addition, examples of excellent driving may be used to instruct less experienced drivers.

In addition, a DRIVERI™ system, or other system in accordance with the certain aspects of the present disclosure may track at-risk but not dangerous driving. These instances may be valuable as coachable moments.

A calculation of a GreenZone™ score may be based on the number of minutes driven in a day in which a dangerous event was detected, in which an at-risk event was detected, and during which the driving behavior met the full set of positive driving criteria. In some embodiments, a GreenZone™ score may be further based on exhibited exemplary behaviors, which may be "above-and-beyond" the expectations of a typical safe driver.

In one embodiment, a DRIVERI™ system may continuously record video and other sensor data while a vehicle is running. In one example, the video and other data may be segmented into 1 minute durations. Based on a 1 min video duration and 100% duty cycle, an eight-hour driving day may generate 480 1-minute videos. A driver may not be active for eight hours continuously. In these cases, the number of recorded videos may be less. The recorded videos may be analyzed with a DRIVERI™ service. A recorded video may be analyzed using processors embedded within a device in the vehicle and/or by one or more processors in the cloud. In some embodiments, the processing capabilities of embedded processors may not be able to analyze all the recorded video as fast as it is collected. In this case, some of the recorded minutes may be ignored. In another embodiment, a processor embedded with the vehicle may process the visual data in a streaming fashion.

Figure 9:
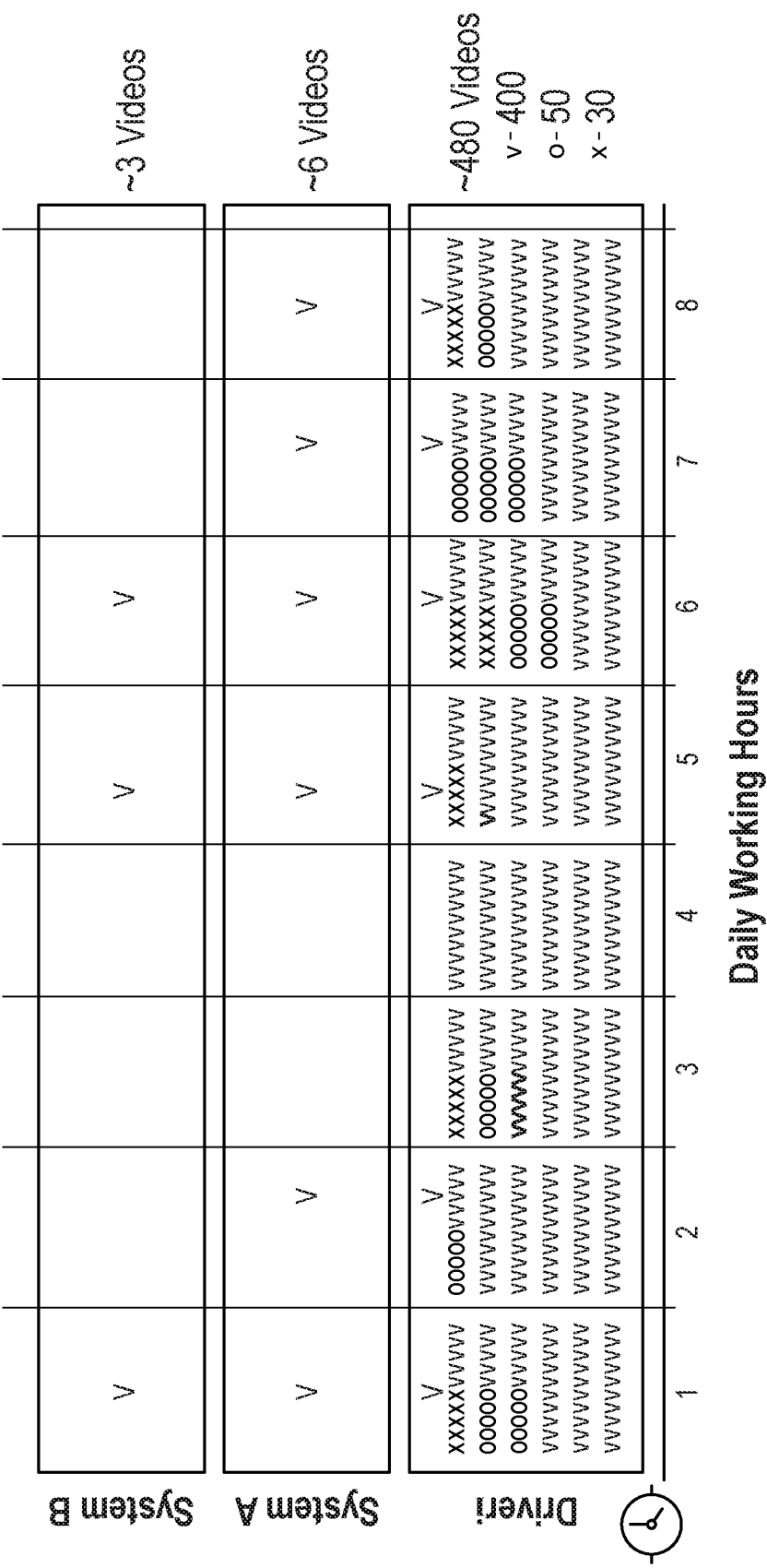
FIG. 9 illustrates an example of a system for determining cause of traffic events and/or encouraging good driving behavior in accordance with certain aspects of the present disclosure.

FIG. 9 illustrates three examples of estimated video collection for an 8-hour driving period. Continuing with the (8 hour) example described above, a DRIVERI™ system may categorize each of the 480 collected videos as GreenZone™, moderate/at-risk, and dangerous/severe. Each marking indicates a one-minute period containing a severe or moderate event. In addition, a minute for which a driver exhibited driving behavior that did not meet all of the pre-determined criteria for GreenZone™ may be indicated with the same symbol as a minute for which a moderate event was detected.

In FIG. 9, "System A" and "System B" may be driver monitoring systems that are based on the detection of inertial events. Inertial events may be events that are detectable by an inertial sensor and may include hard-braking, hard turns, and the like. For each of these systems, the detection of an inertial event may cause a camera to record one minute of video. The video may then be analyzed by a human analyst. In this illustration, System A detected 6 inertial events over the course of an 8-hour period. The first event occurred in the first hour. The second event occurred in the second hour. Then one event occurred in each hour from hour 5 through hour 8. Based on this view, a fleet manager does not know if the driver was actively driving in hours 3 and 4. Likewise, the fleet manager does not know how much of the driver's time was spent in compliance with all of the fleet's safety guidelines, and how much time was spent in at-risk driving situations that did not trigger an inertial event. In this illustration, System B detected 3 events over the same period. The lower number of detected events by System B, in comparison to System A, may be due to the use of different sensors, higher threshold settings, bandwidth considerations, and the like. Because System A and System B are triggered by inertial events, they may also miss severe events that do not have a corresponding inertial signature. An example of such an event may be the running of a red light.

Figure 10:
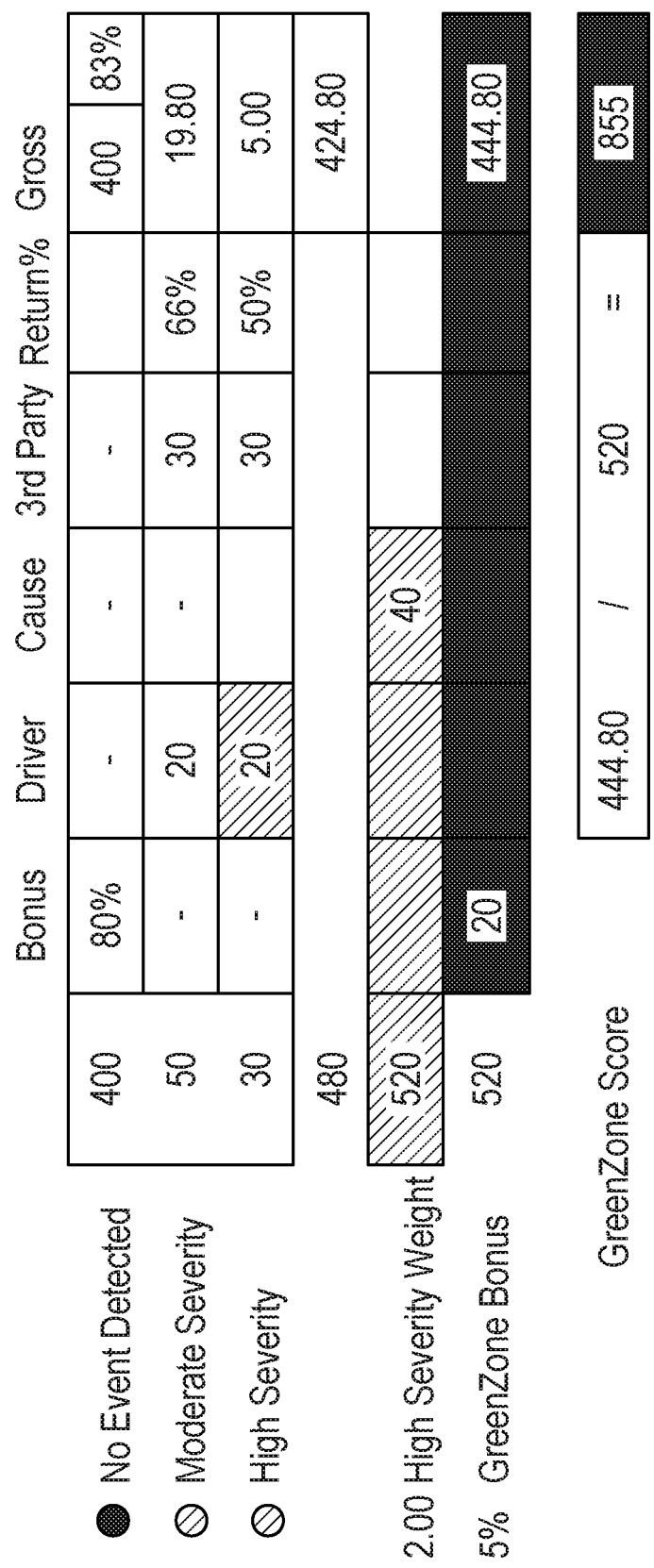
FIG. 10 illustrates an example of a system for determining cause of traffic events and/or encouraging good driving behavior in accordance with certain aspects of the present disclosure.

FIG. 9 and FIG. 10 illustrate the following distribution of one-minute driving intervals as determined by the aforementioned DRIVERI system: No Event Detected/Green/ ('v')=400; Moderate Event Detected/Yellow/('o')=50; Severe Event Detected/Red/('x')=30. In addition to classifying the severity of detected events, in accordance with certain aspects of the present disclosure a traffic event may be assigned a cause. FIG. 10 further illustrates that Moderate and Severe events may be further categorized as Caused by the Driver or Caused by a Third Party. The following distribution of causes is illustrated: Yellow (50): Driver Cause—20, Third Party Cause—30; Red (30): Driver Cause—20, Third Party Cause—10. For some detected events, a system in accordance with the present disclosure may be unable to determine a cause. In these cases, the cause may be "unknown." In some embodiments, an event with an "unknown" cause may be treated the same as an event that was affirmatively determined to be caused by a third party. Likewise, an event with an "unknown" cause may be treated the same as an event that was affirmatively determined to be caused by the Driver.

GreenZone™ scoring, which may summarize a driver's driving behavior over an interval of time, may take into consideration detected events that were identified as having risk, but determined to not be caused by the driver. These atypical events may negatively impact a driver's summary score because it may be desirable for a driver to avoid such situations, even if they were caused by someone or something else. Still, it may be desirable that such events negatively impact a driver's summary score less so than similar events that were caused by the driver. In some embodiments, Moderate and High severity events that are caused by a third party may be partially credited back to the driver through a pre-configured weighting. In the example illustrated in FIG. 10, a moderate severity interval for which the detected event was attributable to a third party could be credited back at a rate of 66%. In this illustration, 30 minutes of driving in an at-risk situation may be counted as 19.80 minutes of GreenZone™ driving if the at-risk situations were caused by a third party. The remaining 10.20 minutes may then be considered time that the driver was not driving in the GreenZone™.

FIG. 10 may be considered an illustration of a scoring matrix. Through configurable parameters severe risk events may be given a greater weight in comparison to moderate risk events. In one example, the denominator of a GreenZone™ score may be given by the number of minutes of active driving in a period of time. A fleet manager may artificially increase the denominator through the use of a High Severity Weight. In this example, a High Severity Weight of 2 may increase the denominator by 40 minutes, corresponding to the 20 minutes of High Severity driving time that was caused by the driver. By increasing the denominator in this way, the overall summary score may be reduced in response to severe traffic events.

In some embodiments, a fleet manager may apply a bonus for drivers who reach a milestone. FIG. 10 illustrates a bonus target of 80%. This means that a driver who logs GreenZone™ time intervals for 80% of his active driving time will receive a bonus number of minutes added to the numerator of his score. In the example illustrated in FIG. 10, the fleet may configure a bonus structure by adding 5% of the GreenZone™ minutes to the accumulated GreenZone™ summary score.

Monitoring Driving Behavior in a Fleet

Figure 11A:
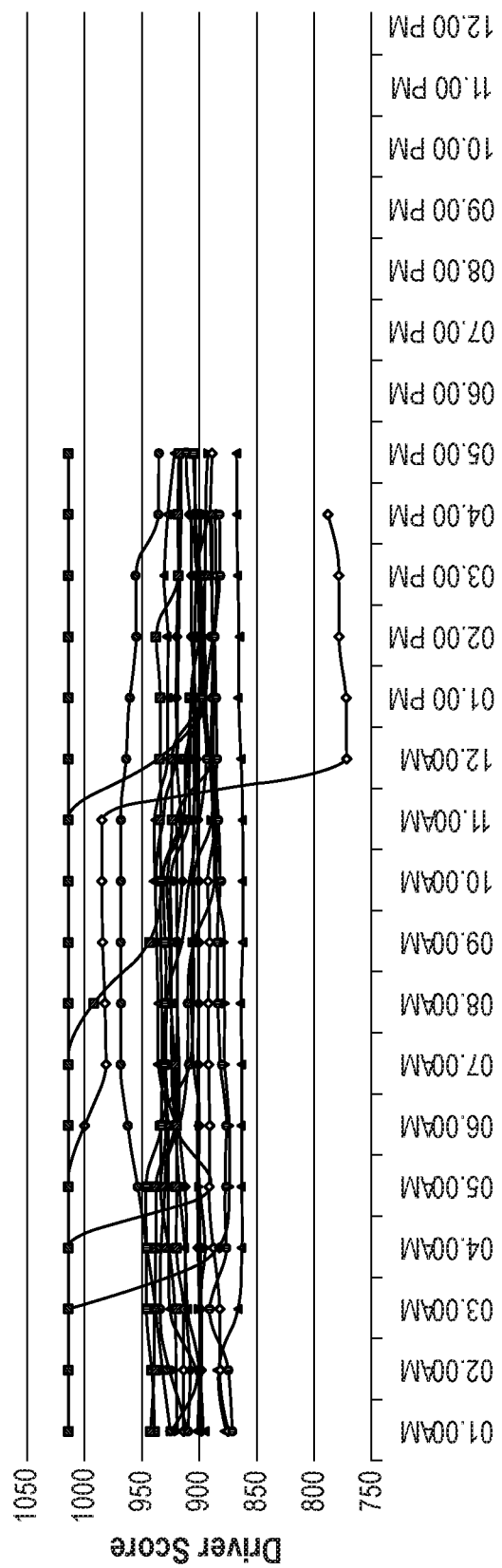
FIG. 11A illustrates an example of a system for determining cause of traffic events and/or encouraging good driving behavior in accordance with certain aspects of the present disclosure.
Figure 11B:
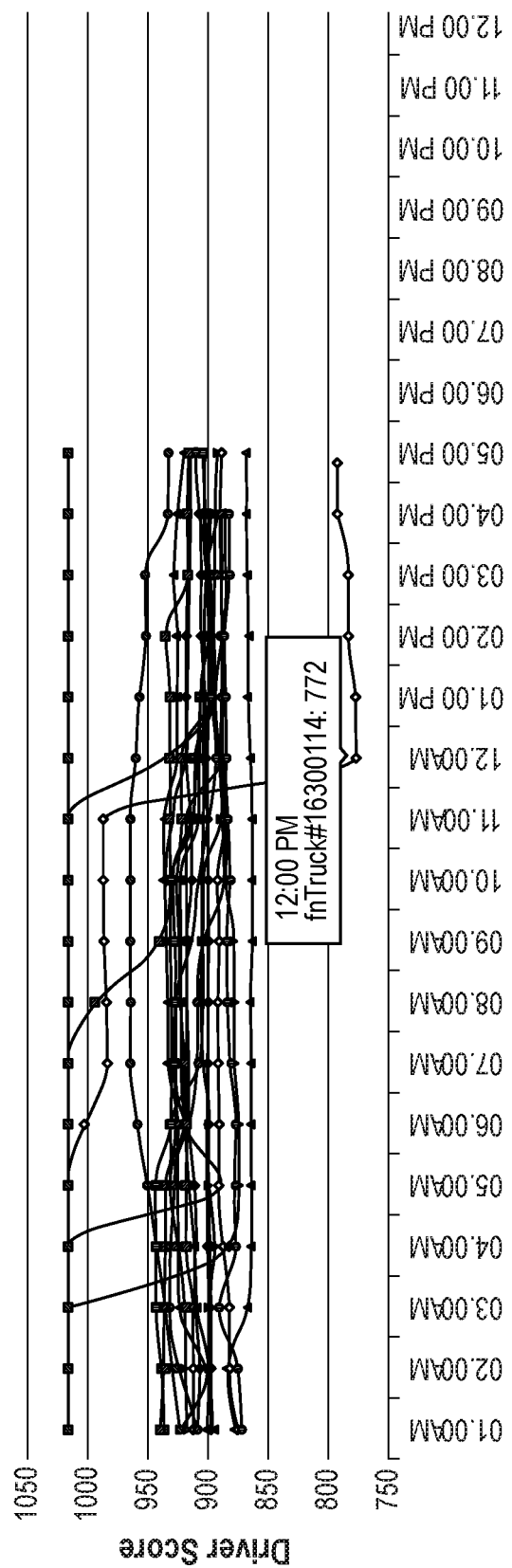
FIG. 11B illustrates an example of a system for determining cause of traffic events and/or encouraging good driving behavior in accordance with certain aspects of the present disclosure.

FIGS. 11A-B illustrates a dynamic view that a fleet manager might use to quickly ascertain the state of his driver associates. A calculated summary score of each driver in the fleet is plotted by time of day. This particular fleet manage may expect his drivers to maintain a score above 850. As can be seen in FIG. 11A, one of the driver score lines falls below 850 between 11:00 AM and 12:00 AM. FIG. 11B illustrates the result of the fleet manager clicking on the line associated with the low-scoring driver. A hover-over window provides additional information about the Driver or Vehicle that was clicked. In this example, a vehicle ID of "fnTruck #16300114" is shown. In these illustrations, a fleet manager may quickly compare the drivers in the fleet against each other.

The fleet manager may investigate additional data to compare GreenZone™ scores calculated for other periods of time, such as the current week and the previous week, or longer periods, such as the current month and the previous month. FIG. 12 illustrates a table view in which summary scores and trend information is presented for a number of individual drivers. The identified Driver, who was driving vehicle "fnTruck #16300114" has a computed rolling score of 788 and a running average weekly score of 910. The running monthly score is also 910. In addition, the running average weekly and monthly scores are trending upwards.

Figure 13:
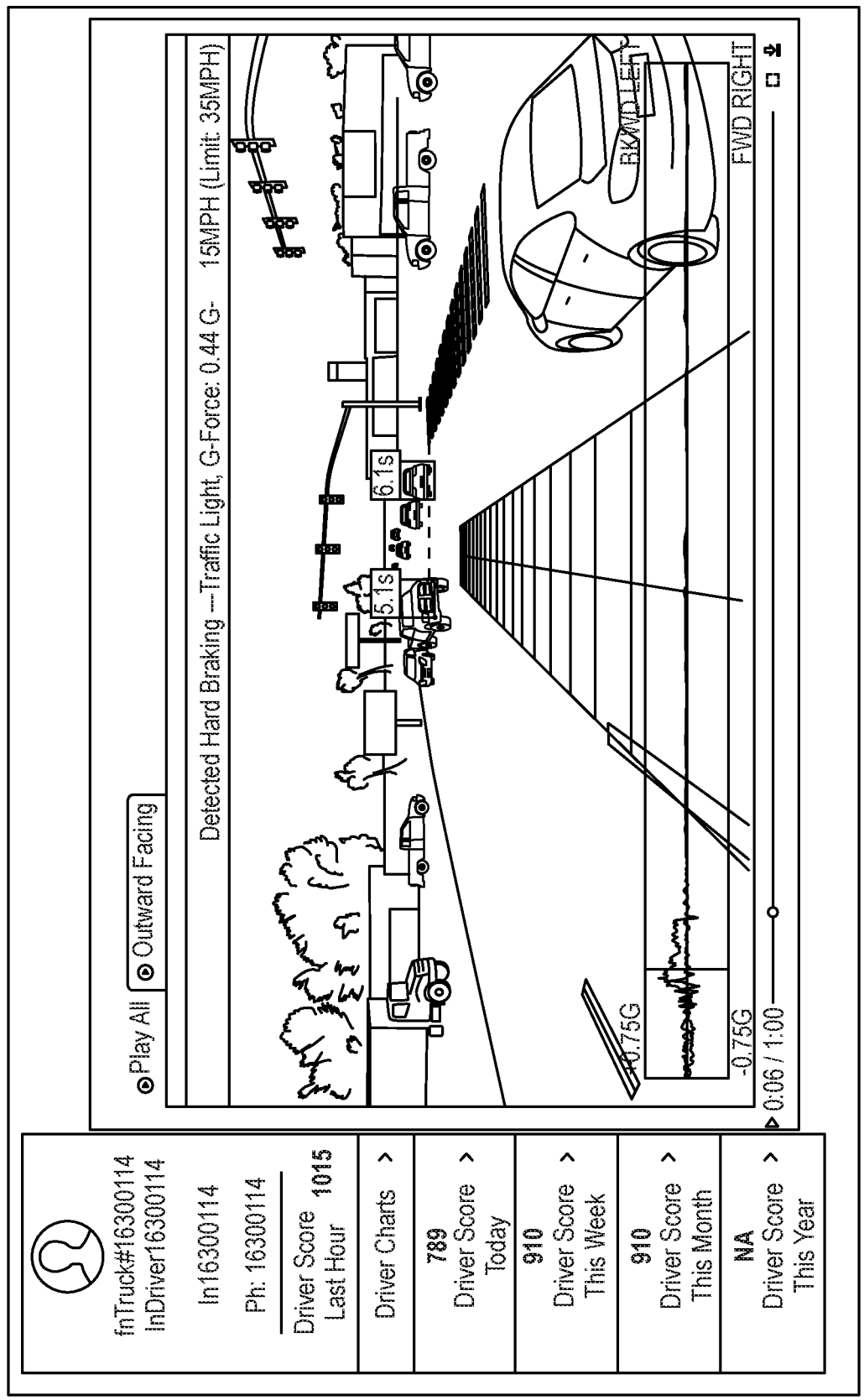
FIG. 13 illustrates an example of a system for determining cause of traffic events and/or encouraging good driving behavior in accordance with certain aspects of the present disclosure.
Figure 14:
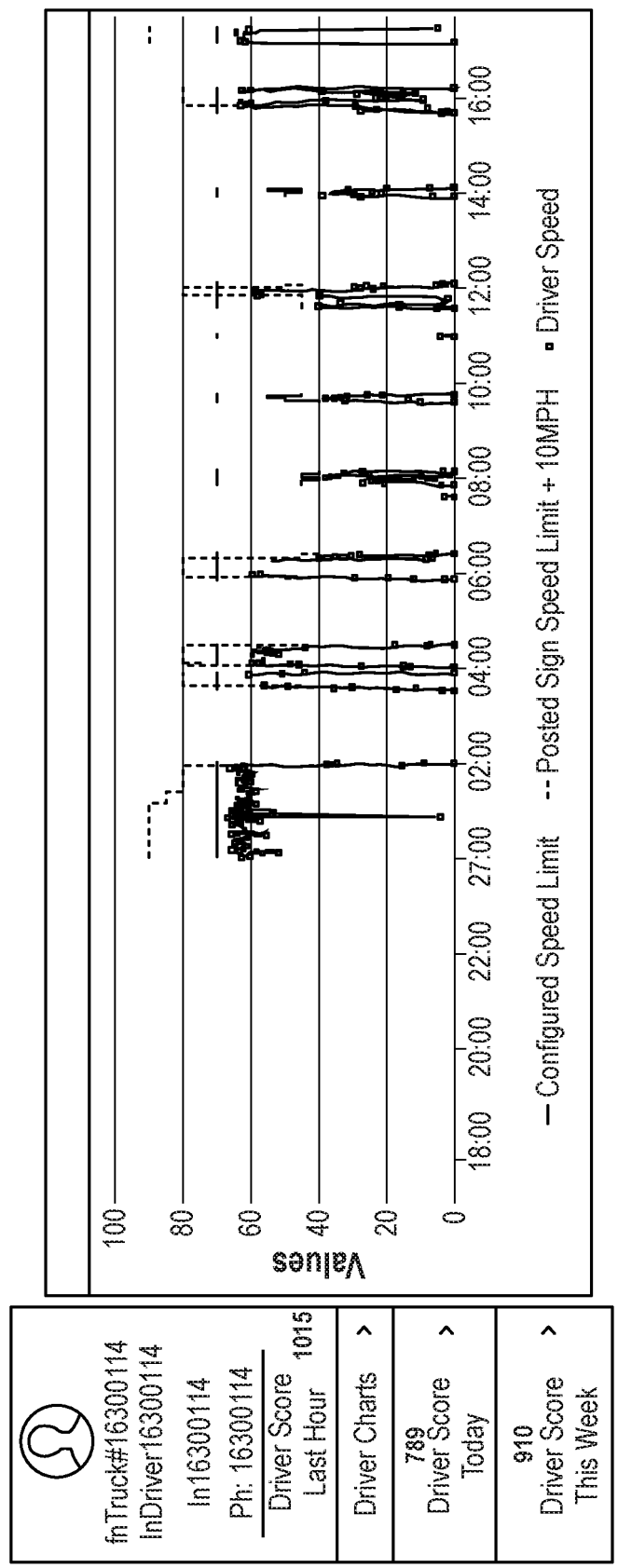
FIG. 14 illustrates an example of a system for determining cause of traffic events and/or encouraging good driving behavior in accordance with certain aspects of the present disclosure.

The fleet manager may also investigate the detected atypical traffic event that precipitated the sudden drop in score. FIG. 13 illustrates a view of an annotated video associated with an atypical traffic event recorded at that time. The video illustrates a hard-braking event at a red light. Due to contextual information, it may be determined that the Driver was at fault for the event, but that the event was not so severe as to cause concern to the fleet manager. In addition, based on other information displayed in the dashboard, the fleet manager may notice that the Driver's score has exceeded 1000 in the previous hour. In this example, the screen-shot was not viewed by the safety manager until a few hours after the occurrence of the event. Some embodiments may be configured so that certain types of severe traffic events trigger an explicit notification to a designated person, such as the fleet manager. In this example, a processor in the vehicle may have determined that the traffic event did not meet the criteria for an immediate notification.

FIG. 13 illustrates another view into the Driver's performance over the course of the day. In this FIGURE, the driver's speed profile over the course of the day is shown along with the Speed Limit. This view may offer additional insight into the Driver's day. In this example, the Driver was engaged in several short duration trips through the middle of the day. As it was known that the Driver was making deliveries to individual stores of a chain, it may be appreciated that the Driver was in more challenging urban areas at these times. Based on this context, an expected Driving score may be somewhat reduced.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a thumb drive, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A system comprising:
a memory; and
a processor coupled to the memory, wherein the processor is configured to:
determine an occurrence of an atypical traffic event at or near a monitored vehicle,
wherein the atypical traffic event determined is that the monitored vehicle is tailgating a second vehicle;
determine a cause of the atypical traffic event based on visual data collected by a sensor at the monitored vehicle, wherein the cause of the atypical traffic event is:
the second vehicle wherein the second vehicle moved in front of the monitored vehicle or slowed down suddenly in front of the monitored vehicle to yield the tailgating atypical traffic event; or
a road condition wherein a traffic control device, hazard in a road, or emergency services vehicle or personnel caused the monitored vehicle to move behind the second vehicle;
determine a severity of the atypical traffic event; and
generate a notification based on whether the driver of the monitored vehicle was not the cause of the atypical traffic event and whether the severity exceeds a predetermined threshold.

2. The system of claim 1, wherein the memory and the processor are both located on or in the monitored vehicle.

3. The system of claim 2, wherein the determination of the cause of the traffic event occurs in real-time or near real-time at the monitored vehicle.

4. The system of claim 1, wherein the visual data collected at the monitored vehicle is captured by at least one or more cameras mounted on or in the monitored vehicle.

5. The system of claim 1, wherein the atypical traffic event is determined further based on at least one or more of:
inertial data collected at the monitored vehicle;
RADAR, LiDAR, or infrared data;
a user input traffic event;
a traffic violation; or
geographical location data associated with the monitored vehicle.

6. The system of claim 1, wherein the processor is further configured to determine that the monitored vehicle performed permitted actions with respect to the atypical traffic event.

7. The system of claim 1, wherein the monitored vehicle is controlled by a first driver or a first control system and the second vehicle is controlled by a second driver or a second control system.

8. The system of claim 1, wherein the tailgating atypical traffic event is determined whenever characteristics of the monitored vehicle in relation to the second vehicle do not adhere to a predetermined criterion.

9. The system of claim 8, wherein determining that the characteristics of the monitored vehicle do not adhere to the predetermined criterion comprises:
determining that a following distance of the monitored vehicle behind the second vehicle is below a predetermined threshold, and wherein the predetermined threshold is based at least on the speed of at least one of the monitored vehicle and the second vehicle.

10. The system of claim 8, wherein the tailgating atypical traffic event is further determined only if the monitored vehicle and the second vehicle are determined to be travelling in the same lane on a roadway.

11. A non-transitory computer readable medium having instructions stored thereon that, upon execution by a computing device, cause the computing device to perform operations comprising:
determining an occurrence of an atypical traffic event at or near a monitored vehicle, wherein the atypical traffic event determined is that the monitored vehicle improperly crossed a lane marker;
determining a cause of the of the atypical traffic event based on visual data collected by a sensor at the monitored vehicle, wherein the cause of the atypical traffic event is:
a second vehicle, wherein the second vehicle moved toward the monitored vehicle causing the monitored vehicle to take evasive action; or
a road condition, wherein a traffic control device, hazard in a road, or emergency services vehicle or personnel caused the monitored vehicle to cross the line marker;
determining an impact of the atypical traffic event on a score for a driver of the monitored vehicle based on the cause; and
generating a notification based on whether the impact on the score exceeds a threshold amount.

12. The non-transitory computer readable medium of claim 11, the operations further comprising:
determining that the occurrence of the atypical traffic event happens a plurality of times to a plurality of vehicles at the same location; and
establishing an exception to how the cause of the atypical traffic event is determined.

13. The non-transitory computer readable medium of claim 11, wherein the atypical traffic event is determined based on geographical location data associated with the monitored vehicle and a known location of a traffic control device.

14. The non-transitory computer readable medium of claim 13, wherein the cause of the atypical traffic event is determined based on a comparison of the data collected at the monitored vehicle to a set of rules stored at the monitored vehicle.

15. The non-transitory computer readable medium of claim 14, the operations further comprising sending the visual data collected to a remote data collection site whenever the atypical traffic event meets a certain predetermined condition based on the comparison to the set of rules.

16. A method comprising:
determining, by a processor of a computing device, an occurrence of an atypical traffic event at or near a monitored vehicle;
determining, by the processor, a cause of the of the atypical traffic event based on visual data collected at the monitored vehicle, wherein the cause of the atypical traffic event is:
a second vehicle; or
a road condition;
determining, by the processor, a safe driving score associated with the monitored vehicle, based on:
an elapsed period of time for which the monitored vehicle was driven,
the atypical traffic event; or
the cause of the atypical traffic event;
updating, by the processor, a cumulative or rolling driver or control system score based on a plurality of safe driving scores;

determining, by the processor, a difference between the cumulative or rolling driver or control system score and an expected driver or control system score; and transmitting, by the processor, a notification based on whether the difference exceeds a predetermined threshold and a criteria for a severity of the atypical traffic event.

17. The method of claim 16, wherein the monitored vehicle is controlled by a first driver or a first control system and the second vehicle is controlled by a second driver or a second control system.

18. The method of claim 16, wherein the atypical traffic event is determined to be tailgating, and the monitored vehicle is determined not to be the cause of the tailgating because the monitored vehicle cannot maneuver to avoid the tailgating atypical traffic event.

19. The method of claim 16, further comprising determining, by the processor, based on the determination of the cause of the atypical traffic event, an impact of the atypical traffic event on a safe driving score associated with the monitored vehicle.

20. The method of claim 19, wherein:

the impact on the safe driving score associated with the monitored vehicle is positive because the cause of the atypical traffic event is not determined to be the monitored vehicle.

21. The method of 16, further comprising determining an affirmative compliance with predetermined safety guidelines by the monitored vehicle for the elapsed period of time.

22. The method of claim 16, further comprising determining a change in the cumulative or rolling driver or control system score; and transmitting a notification based on whether the change exceeds a predetermined threshold.

23. The method of claim 16, further comprising determining an expected driver or control system score based on at least one or more of:

an identity of a driver or control system of the monitored vehicle;

a vehicle type of the monitored vehicle;

a time of day;

a geographical location;

a traffic density;

a weather condition; or a composition of transported goods.

24. The method of claim 16, wherein the atypical traffic event determined is that the monitored vehicle ran a red light, and:

the cause of the atypical traffic event is determined to be the road condition wherein a traffic guard or secondary traffic control device directed the monitored vehicle to run the red light.

25. The method of claim 16, wherein the atypical traffic event determined is that the monitored vehicle experienced a hard braking event, and:

the cause of the atypical traffic event is determined to be the second vehicle wherein the monitored vehicle reacts to a sudden change of speed or position of the second vehicle; or the cause of the atypical traffic event is determined to be the road condition wherein a red or yellow light, stop sign, brake light of another vehicle, other traffic control device, hazard in a road, or emergency services vehicle or personnel was not visible in a good time to allow the monitored vehicle to react.

\* \* \* \* \*